United States Patent
Dryer et al.

(10) Patent No.: US 10,949,844 B2
(45) Date of Patent: Mar. 16, 2021

(54) PROCESSING ELECTRONIC PAYMENT INVOLVING MOBILE COMMUNICATION DEVICE

(75) Inventors: Trevor D. Dryer, San Francisco, CA (US); Eran Arbel, Los Altos, CA (US); Alexander S. Ran, Palo Alto, CA (US); Ajay Tripathi, San Ramon, CA (US); Douglas Lethin, Rading, MA (US); Bennett R. Blank, San Diego, CA (US); Eugene Krivopaltsev, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 963 days.

(21) Appl. No.: 13/103,957

(22) Filed: May 9, 2011

(65) Prior Publication Data

US 2012/0290376 A1 Nov. 15, 2012

(51) Int. Cl.
*G06Q 20/40* (2012.01)
*G06Q 20/32* (2012.01)
(Continued)

(52) U.S. Cl.
CPC ............. *G06Q 20/40* (2013.01); *G06Q 20/02* (2013.01); *G06Q 20/20* (2013.01);
(Continued)

(58) Field of Classification Search
USPC ............................... 235/379, 380; 705/44, 79
See application file for complete search history.

(56) References Cited

U.S. PATENT DOCUMENTS 6,029,150 A * 2/2000 Kravitz ........................ 705/39
6,487,540 B1 11/2002 Smith et al.
(Continued)

FOREIGN PATENT DOCUMENTS

WO 2010/141456 A2 12/2010
WO 2010141456 A2 12/2010

OTHER PUBLICATIONS

Office Action dated Oct. 3, 2011, Amendment dated Feb. 3, 2012, Final Office Action dated Apr. 5, 2012 and Interview Summary dated Aug. 14, 2012 in U.S. Appl. No. 12/625,540, filed Nov. 24, 2009, (52 pages).
(Continued)

*Primary Examiner* — Kirsten S Apple
*Assistant Examiner* — Martin A Gottschalk
(74) *Attorney, Agent, or Firm* — DLA Piper LLP (US)

(57) ABSTRACT

Mobile payments and processing data related to electronic transactions. A near field communication connection is established between a mobile communication device of a consumer that serves as a mobile wallet and an electronic payment device of a merchant. Authorization data is shared between the mobile communication device and the electronic payment device without providing electronic payment instrument (e.g. credit card) data to the merchant. Authorization data is transmitted from the mobile communication device to a cloud computer or resource that serves as a cloud wallet and hosts respective data of respective electronic payment instruments of respective consumers, and from the electronic payment device a payment processor computer. The payment processor computer presents the authorization data to the cloud wallet, and in response, the cloud wallet transmits the credit card data to the payment processor computer, which processes the transaction.

25 Claims, 14 Drawing Sheets

(51) Int. Cl.
*G06Q 20/36* (2012.01)
*G06Q 20/20* (2012.01)
*G06Q 20/38* (2012.01)
*G06Q 20/42* (2012.01)
*G06Q 20/02* (2012.01)

(52) U.S. Cl.
CPC ......... *G06Q 20/3278* (2013.01); *G06Q 20/36* (2013.01); *G06Q 20/385* (2013.01); *G06Q 20/425* (2013.01)

(56) References Cited

U.S. PATENT DOCUMENTS

| | | | |
|---|---|---|---|
| 6,738,749 B1 | 5/2004 | Chasko | |
| 7,103,575 B1* | 9/2006 | Linehan | 705/64 |
| 7,987,120 B2 | 7/2011 | Shiftan et al. | |
| 8,055,184 B1* | 11/2011 | DiMartino et al. | 455/1 |
| 8,559,987 B1* | 10/2013 | Fisher | 455/466 |
| 2002/0107791 A1 | 8/2002 | Nobrega et al. | 705/39 |
| 2003/0014267 A1 | 1/2003 | Culp | |
| 2003/0023549 A1* | 1/2003 | Armes et al. | 705/40 |
| 2003/0055733 A1 | 3/2003 | Marshall et al. | |
| 2003/0126020 A1 | 7/2003 | Smith et al. | |
| 2003/0126094 A1 | 7/2003 | Fisher et al. | |
| 2004/0127256 A1* | 7/2004 | Goldthwaite et al. | 455/558 |
| 2004/0220964 A1 | 11/2004 | Shiftan et al. | |
| 2006/0038003 A1 | 2/2006 | Wakasa et al. | |
| 2006/0273163 A1* | 12/2006 | Gusler et al. | 235/383 |
| 2007/0022058 A1 | 1/2007 | Labrou et al. | |
| 2007/0069013 A1 | 3/2007 | Seifert et al. | |
| 2007/0094087 A1 | 4/2007 | Mitchell et al. | |
| 2007/0125840 A1* | 6/2007 | Law et al. | 235/379 |
| 2007/0288322 A1 | 12/2007 | Watanabe | |
| 2008/0208762 A1* | 8/2008 | Arthur et al. | 705/79 |
| 2008/0222048 A1 | 9/2008 | Higgins et al. | |
| 2008/0235749 A1 | 9/2008 | Jain et al. | |
| 2009/0043647 A1 | 2/2009 | Hwang et al. | |
| 2009/0254485 A1 | 10/2009 | Baentsch et al. | |
| 2009/0271265 A1 | 10/2009 | Lay et al. | |
| 2010/0063893 A1 | 3/2010 | Townsend | |
| 2010/0125510 A1 | 5/2010 | Smith et al. | |
| 2010/0131347 A1 | 5/2010 | Sartipi | |
| 2010/0216396 A1 | 8/2010 | Fernandez et al. | |
| 2010/0274726 A1 | 10/2010 | Florek et al. | |
| 2010/0287058 A1 | 11/2010 | Rosskamm et al. | |
| 2010/0325047 A1 | 12/2010 | Carlson et al. | |
| 2011/0078031 A1* | 3/2011 | Mardikar et al. | 705/17 |
| 2044/0071921 | 3/2011 | Crespo et al. | |
| 2011/0087529 A1* | 4/2011 | Angell | 705/14.13 |
| 2011/0125598 A1 | 5/2011 | Shin et al. | |
| 2011/0143663 A1* | 6/2011 | Renard et al. | 455/41.1 |
| 2011/0161232 A1* | 6/2011 | Brown | 705/71 |
| 2011/0238573 A1* | 9/2011 | Varadarajan | 705/43 |
| 2012/0011063 A1* | 1/2012 | Killian et al. | 705/41 |
| 2012/0136780 A1* | 5/2012 | El-Awady et al. | 705/40 |
| 2012/0143707 A1* | 6/2012 | Jain | 705/18 |
| 2012/0259686 A1* | 10/2012 | Yurow | 705/14.17 |
| 2012/0259775 A1* | 10/2012 | Gui | 705/41 |
| 2013/0030828 A1* | 1/2013 | Pourfallah et al. | 705/2 |
| 2013/0140360 A1* | 6/2013 | Graylin | 235/380 |
| 2013/0246199 A1* | 9/2013 | Carlson | 705/16 |

OTHER PUBLICATIONS

Office Action dated Oct. 3, 2012 in U.S. Appl. No. 13/284,760, filed Oct. 28, 2011, (9 pages).
http://www.engadget.com/2011/03/27/google-teams-with-mastercard-and-citigroup-for-nfc-payment-demo/, May 9, 2011 (3pages).
http://cloudcomputing.sys-con.com/node/1744979, May 9, 2011 (5pages).
http://www.ababj.com/payments/what-s-paypal-up-to-july-2010.html, May 9, 2011 (3pages).
http://cloudcomputingexpo.com/event/sessions, May 9, 2011 (35pages).
PCT International Search Report for PCT/US2011/036978, Applicant: Intuit Inc., Form PCT/ISA/210 and 220, dated May 1, 2012 (5 pages).
PCT Written Opinion of the International Search Authority for PCT/US2011/036978, Applicant: Intuit Inc., Form PCT/ISA/210/220, dated May 1, 2012 (6 pages).
Extended European Search Report dated Dec. 9, 2014 in European Application No. 11865339.3, Applicant: Intuit Inc. (7 pages).
Office Action dated Feb. 17, 2016 in European Application No. 11865339.3, Applicant: Intuit Inc. (7pages).
http://en.wikipedia.org/wiki/Near_field_communication#Comparison_with_Bluetooth, printed: Jun. 21, 2013 (13pages).
Patent Examination Report No. 1 in Australian Patent Application No. 2011367804, dated Nov. 2, 2016, (3pages).
Response Patent Examination Report No. 1 in Australian Patent Application No. 2011367804, dated May 17, 2017, (27pages).
Patent Examination Report No. 2 in Australian Patent Application No. 2011367804, dated Jun. 15, 2017, (4pages).
Response Patent Examination Report No. 2 in Australian Patent Application No. 2011367804, dated Jul. 10, 2017, (2pages).
Patent Examination Report No. 3 in Australian Patent Application No. 2011367804, dated Aug. 7, 2017, (3pages).
Examination Report in Canadian Patent Application No. 2,835,514, dated May 17, 2016, (5pages).
Response to Examination Report in Canadian Patent Application No. 2,835,514, dated Oct. 27, 2016, (21pages).
Examination Report in Canadian Patent Application No. 2,835,514, dated Mar. 10, 2017, (4pages).
Response to Examination Report in Canadian Patent Application No. 2,835,514, dated Jul. 19, 2017, (3pages).
Response to Examination Report in European Patent Application No. 11865339.3 dated Aug. 19, 2016, (14pages).

* cited by examiner

| | Consumer 602a | Credit Card 602b | Check Data 602c | ACH Data 602d | Other Electronic Payment Data 602e |
|---|---|---|---|---|---|
| | Consumer 1 | CC1, CC2, CC3 | Check 1 | | |
| | Consumer 2 | CC4 | | ACH1 | |
| | Consumer 3 | CC5, CC6 | Check 2, Check 3 | | Other .1 |

| Credit Card 612a | Authorization Token 612b | Authorized Amount 612c | Token Date/Time 612d | Time Token Valid 612e | MerchantID 612f |
|---|---|---|---|---|---|
| CC1 | Token 1 | Amount1 | | | |
| CC1 | Token 2 | | Date/Time2 | 6 hours | |
| CC2 | Token 4 | Amount4 | Date/Time4 | 2 hours | |
| CC3 | Token 5 | Amount5 | | | MerchantID4 |
| CC4 | | | | | |

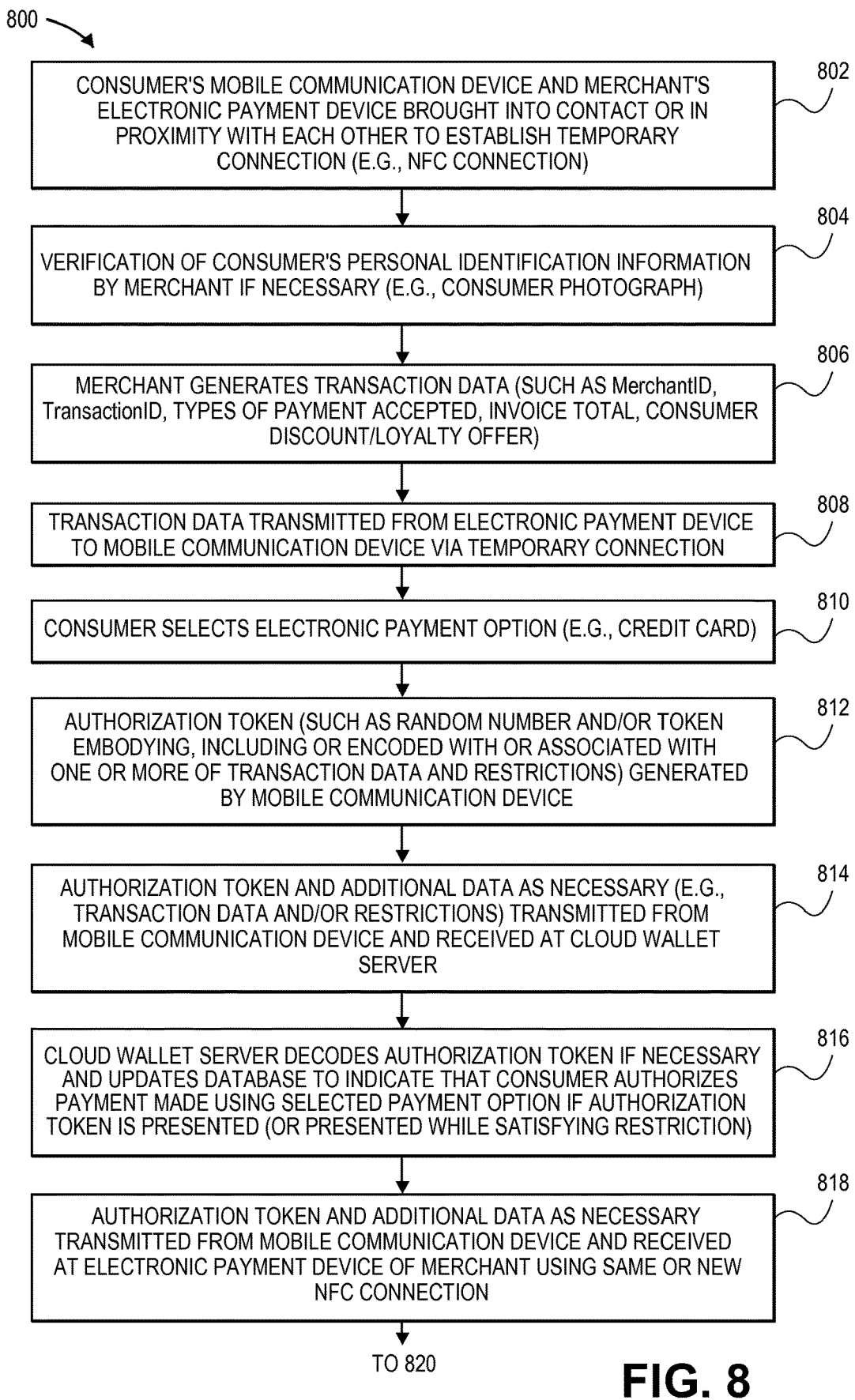

PROCESSING ELECTRONIC PAYMENT INVOLVING MOBILE COMMUNICATION DEVICE

BACKGROUND

Embodiments of the invention are generally related to electronic commerce and, more particularly, to electronic payments made utilizing a mobile communication device. Customers or consumers of merchant stores or retail establishments often pay for goods or services using a communication devices for accepting payment, and for this purpose, they may utilize a payment or transaction card such as a credit card. Some merchants utilize mobile Smartphone including a payment application or software program that is operable by the merchant for electronically accepting payment from a consumer. Payments can be accepted at various locations including various residential and commercial locations, houses, offices, job sites, cities, states and countries at various times.

For example, during a transaction, the merchant may manually enter credit card data into a payment terminal or the consumer or merchant may swipe the card through a payment terminal. If the merchant utilizes a mobile device, the merchant may enter data into the mobile device or swipe the card if the mobile device is so equipped. Transaction data is sent to a third party payment processor that serves as an intermediary to process the transaction.

While many transactions are successfully completed using credit cards, entry of credit card data can be time consuming and inconvenient. Mobile wallets are being developed to facilitate electronic payments. Rather than payment by cash, check or credit card, a consumer utilizes a mobile communication device for payment. For example, mobile wallets are utilized in Japan to purchase train tickets and in Europe to pay for parking, but implementation of mobile wallets in the United States for electronic payment in merchant stores has been slow and limited due to various concerns and limitations such as consumer security and privacy concerns and lack of supporting infrastructure. For example, certain studies have estimated only a small fraction of the about 105 million mobile payment users in the world are located in North America. Given these concerns and limitations, consumers may be more inclined to continue using traditional credit card and check payments until mobile wallet applications are more developed and secure such that consumers, merchants and payment processors can all be confident that mobile wallet payments can be reliably processed.

SUMMARY

Embodiments relate to processing electronic transactions in which a consumer tenders electronic payment to a merchant using a mobile communication device such as a Smartphone that is a mobile wallet, a near field communication (NFC) connection between the consumer's mobile communication device and a merchant's electronic payment device, which may also be a Smartphone, and a cloud computer, server or resource. The cloud computer hosts or accesses a database storing the consumer's mobile wallet data (e.g., credit card data) and releases credit card data to a payment processor to complete the transaction if the payment processor presents an authorization token to the cloud resource. For this purpose, according to embodiments, the authorization token is generated, exchanged between the merchant and consumer using a communication protocol such as peer-to-peer communication, and provided to a payment processor and the cloud computer. The payment processor, after receiving the authorization token from the merchant's electronic payment device, requests electronic payment data (e.g., credit card number, expiration, etc.) from the cloud resource. Assuming the authorization token is valid, the payment processor receives the electronic payment data, processes the transaction, and updates a merchant account.

Embodiments are directed to methods performed by or involving, systems of or utilized by, and articles of manufacture or computer program products or applications of or utilized by one or multiple parties of involved in the electronic transaction. According to embodiments, the parties involved include a consumer who carries a mobile communication device serving as a mobile wallet, a merchant utilizing an electronic payment device, a host or computer or cloud resource including respective payment or credit card data of respective consumers, and an intermediate party or host that processes the electronic transaction on behalf of a merchant utilizing payment data received from the cloud resource.

One embodiment is directed to a computer-implemented method for processing data related to an electronic transaction involving a consumer and a merchant and comprises establishing a NFC connection between an electronic payment device of the merchant and a mobile communication of the consumer. The short range NFC connection is established when the electronic payment device and the mobile communication device contact or are placed sufficiently close to each other. Authorization data such as a token or other data known to the merchant and consumer devices is sent from one and received by the other. Thus, authorization data is shared between the mobile communication device and the electronic payment device using the NFC connection. However, electronic payment data, such as credit card data number and expiration date, is not transmitted to the merchant. Instead, the authorization data is transmitted from the mobile communication device through a first network to a cloud computer, server or resource, which may host respective data of respective payment cards of respective consumers, and also transmitted from the electronic payment device through a second network to an electronic payment processor. Having the authorization data, the payment processor computer can retrieve electronic payment data by presenting the authorization data to the cloud computer, and then process the transaction with the electronic payment data and update a merchant account.

According to another embodiment, the authorization data or token embodies, or is encoded with, data of the merchant and/or transaction (generally, transaction data). For example, transaction data encoded may include one or more of a merchant identification, transaction identification, an invoice, receipt or transaction amount, a transaction date, etc. An encoded authorization token can be decoded to determine the token and associated transaction data. In this embodiment, a NFC connection is established between an electronic payment device of the merchant and a mobile communication of the consumer when the electronic payment device and the mobile communication device contact or are located in proximity to each other. The authorization data or a token is generated and embodies data of a transaction involving the consumer and the merchant. For this purpose, the merchant may generate the authorization data embodying or encoded with transaction data, or transaction data can be sent to the consumer's mobile communication device, which generates authorization data embodying or encoded with transaction data. The authorization data or token is transmitted from the mobile communication device through a first network to a first computer or cloud computer hosting respective data of respective payment cards of respective consumers, and from the electronic payment device through a second network to a second computer of an electronic payment processor. The payment processor presents the authorization data to the cloud computer to request electronic payment data of the consumer associated with the authorization data, which may be decoded by the first computer if necessary, compared with the authorization data received from the consumer, e.g., by accessing a database or record for that consumer or authorization data, and if the transaction data matches, the payment processor can be provided with the electronic payment data to complete the transaction.

A further embodiment is directed to a system for processing data related to an electronic transaction involving a consumer and a merchant and comprises a mobile communication device carried by a consumer used to establish a NFC connection with an electronic payment device of a merchant. A mobile wallet application executing on the mobile communication device generates or receives authorization data that is also shared with the electronic payment device utilizing the NFC connection, but without transmitting payment data (e.g., credit card number) to the merchant. The mobile communication device is also configured or operable to transmit the authorization data through a first network to a first computer hosting respective data of respective payment cards of respective consumers so that when the authorization data is transmitted from the electronic payment device through a second network to a second computer of an electronic payment processor and presented by the second computer to the first computer, which can return payment card data to the payment processor to allow the payment processor to complete the transaction.

Other system embodiments include one or more or all of the merchant's electronic payment device, the first or cloud computer and the second or payment processor computer. In certain system embodiments, the mobile communication device of the consumer and/or the electronic payment device of the merchant is configured or operable to generate authorization data or a token encoded with or embodying transaction data such as a merchant identification or transaction amount. Other embodiments are directed to a merchant's electronic payment device configured to implemented method embodiments, a first or payment processor computer configured to implement method embodiments, and a second or cloud wallet computer configured to implement embodiments.

Other embodiments are directed to applications and articles of manufacture or computer program products comprising a non-transitory, computer readable storage medium having instructions which, when executed by a first computer of a consumer or other computer of system embodiments, cause the one or more processors to execute a method for processing data related to an electronic transaction involving a consumer and a merchant.

In a single or multiple embodiments, the electronic payment device is a Point Of Sale (POS) device located at the merchant location. In other embodiments, the merchant utilizes a mobile communication device such as a Smartphone that includes a mobile payment application executing thereon that allows the merchant to accept payment from the consumer without receiving payment data such as credit card data.

In a single or multiple embodiments, the second or payment processor computer presents authorization data received from the merchant to the first or cloud computer to request electronic payment data such as credit card data of the consumer. In response, the payment processor computer receives the requested credit card data from the first computer so that the second computer processes the transaction using the received credit card data and updates a merchant account hosted or accessible by the second computer.

In a single or multiple embodiments, the electronic payment device and the mobile communication device are connected to each other in a peer-to-peer configuration so that authorization data can be generated by either of the electronic payment device or the mobile communication device and transmitted to the other. This is in contrast to certain systems that utilize restrictive or one-way communications (e.g., transmitting a tag from a mobile communication device to a merchant payment device).

In a single or multiple embodiments, the authorization data is a random number. The random number may be generated by a mobile wallet application or payment application, or by a separate random number generator or a controller of a NFC chip. According to one embodiment, authorization data generated according to embodiments is dynamic such that different authorization data or tokens are utilized for different purchases by a consumer. In a further embodiment, the authorization data or token is a single use token such that once generated and provided to the cloud computer, only a single request for the data may be presented by the payment processor. The authorization data or token may also be encoded with or associated with date or time restrictions, conditions or limitations. One example restriction is that the token is valid for a limited time and must be utilized by the payment processor within a certain time from generation of the token or receipt of the token.

In a single or multiple embodiments, the merchant transmits an offer, advertisement, coupon, discount or loyalty incentive to the consumer, e.g., to encourage the consumer to select a certain type of payment or certain credit card on behalf of an issuer of the credit card. For example, the merchant may have an arrangement with VISA or another issuer so that the merchant offers a discount to the consumer if the consumer utilizes a VISA credit card.

In a single or multiple embodiments, authorization data or tokens that embody or are encoded with transaction data may be encoded with one or more or all of a merchant identification, a transaction identification, a transaction amount, and accepted forms or types of electronic payment. Encoding authorization data or utilizing additional data in this manner provides additional security and assurances to the parties involved in the transaction that the payment processing involves the correct consumer and the correct transaction amount. Thus, when the cloud computer receives an encoded token, the cloud computer can decode the token if necessary, e.g., using a key shared with the consumer, to determine the transaction data, store the transaction data in a database so that the transaction data is associated with the authorization token. In this manner, when the payment processor presents the authorization token to the cloud wallet, the cloud wallet can provide the credit card data and specify what amount is properly charged to the credit card, instead of relying on the merchant and/or payment processor to charge the correct amount.

BRIEF DESCRIPTION OF THE DRAWINGS

The foregoing and other aspects of embodiments are described in further detail with reference to the accompanying drawings, wherein:

FIGS. 6A-B illustrate examples of how embodiments may be implemented to manage and update a cloud database that hosts electronic payment data of consumers;

Figure 1:
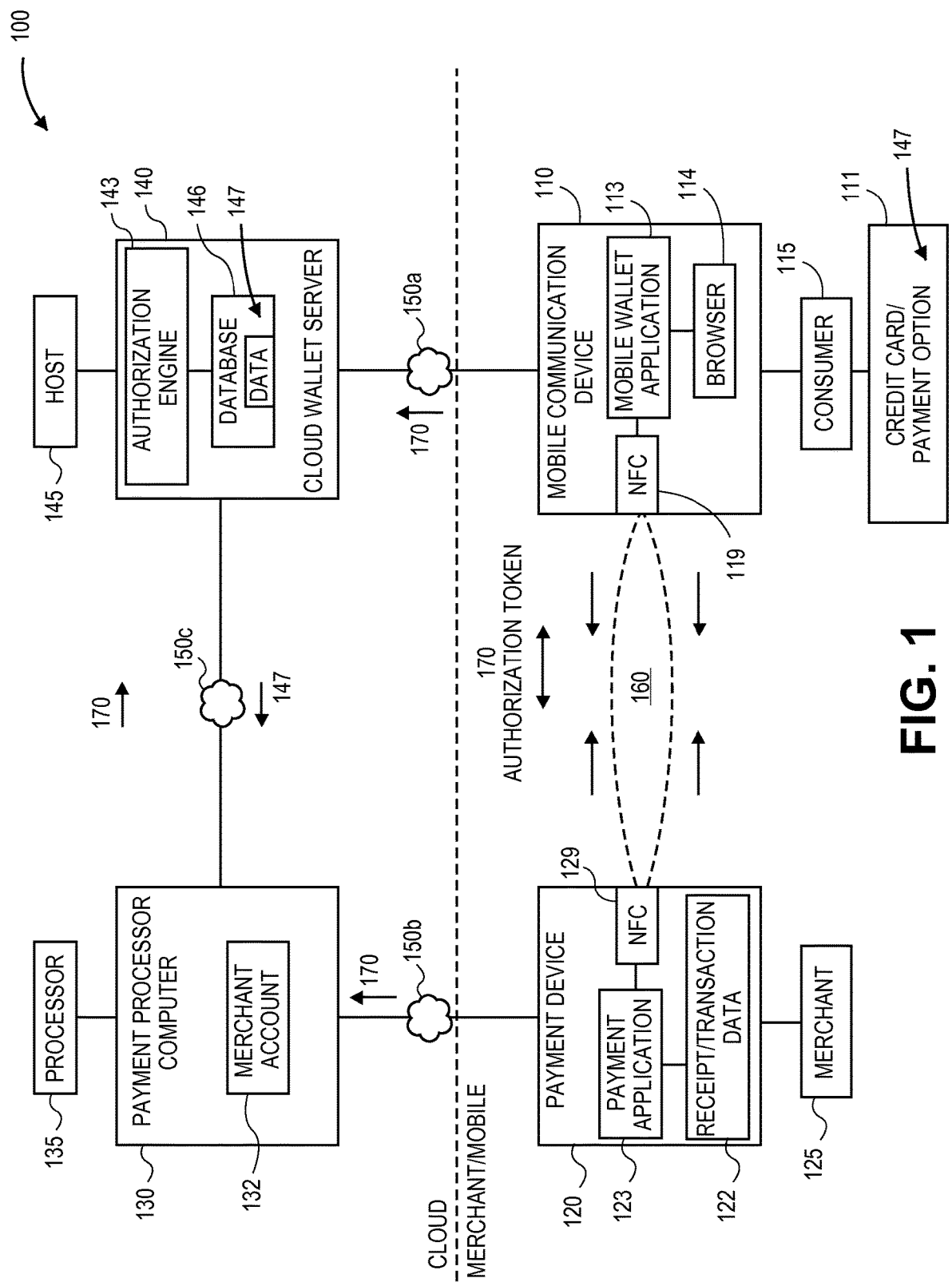
FIG. 1 is a block diagram of a system constructed according to one embodiment for generating an authentication token for use in processing an electronic transaction without providing electronic payment data to a merchant.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments relate to processing of electronic transactions involving a merchant and a consumer that pays for an item purchased from the merchant using a mobile communication device while not providing data of the form of payment (e.g., credit card number) to the merchant. Embodiments involve or are executed by mobile communication device of the consumer that has an application that transforms the mobile communication into a mobile wallet. The mobile wallet is tendered by the consumer to pay for an item from the merchant without tendering a physical credit card or providing credit card data to the merchant. Instead, embodiments involve sharing of authorization data or a token by the merchant and the consumer, e.g., using peer-to-peer communications. The authorization data or token is provided to a cloud wallet server and to a payment processor. The cloud wallet server stores data about the types or forms of electronic payment available to the consumer, and which form of electronic payment was selected by the consumer for a particular transaction authorized by the consumer according to the authorization data or token. To process the transaction, the authorization data or token is provided to a payment processor, which presents the authorization data or token to the cloud wallet server. If the presented authorization data or token is valid or matches records of the cloud wallet server, the cloud wallet server provides payment data (e.g., credit card data such as credit card number, expiration date and security code) to the payment processor computer, which processes the transaction with the received payment data so that the consumer's credit card is charged, and a merchant account is updated to reflect the completed transaction. A merchant account is a type of bank account that allows a merchant to accept electronic payment by credit or debit card, for example, and is utilized for settlement of credit card and/or debit card transactions.

Thus, with embodiments, consumer credit card information is stored securely on a server of the cloud that serves as a cloud wallet server, consumers are not required to provide credit card data to merchants, and consumers can be more confident about utilizing mobile communication devices as mobile wallets since their credit card information is safeguarded by the cloud wallet server. Further, merchants, consumers and payment processors can be confident that mobile wallet transactions can be securely and efficiently processed in a secure manner. Further aspects of embodiments are described with reference to FIGS. 1-2, and examples of how embodiments may be implemented are described in further detail with reference to FIGS. 3-11.

Referring to FIG. 1, a system 100 constructed according to one embodiment involves or comprises one or more or all of a mobile communication device 110 of a consumer 115, an electronic payment device 120 of a merchant 125, a computer or server 130 of a payment processor 135 that processes transactions and manages or accesses a merchant account 132 on behalf of the merchant 125, and a cloud computer, server or resource (generally, cloud computer 140) of a host 145 that manages a database 146 containing electronic payment data 147 (e.g., credit card number, expiration date, security code) utilized by the consumer 115. Mobile communication device 110 and cloud computer 140 are in communication with each other via a network 150a, electronic payment device 120 and payment processor computer 130 are in communication with each other via network 150b, and payment processor computer 130 and cloud computer 140 are in communication with each other via network 150c. In the illustrated embodiment, the consumer has one or more forms of electronic payment 111 (three credit cards 111a-c are illustrated as an example), and registers with cloud computer 140, which serves as a cloud wallet resource or computer and stores consumer's credit card data in a database 142.

In the illustrated embodiment, the consumer 110 tenders the mobile communication device 110, which serves as a mobile wallet, to pay for an item, good or service (generally, item) offered by the merchant 125. For this purpose, the mobile communication device or mobile wallet 110 may involve or authorize various types of electronic payments including, but not limited to credit card, debit card, ATM card, ACH, eCheck, PAYPAL and other forms of payment capable of being made or authorized using the mobile communication device 110. For ease of explanation, reference is made generally to a mobile communication device 110 or mobile wallet and a credit card 111. Mobile communication devices 110 that may be utilized in embodiments include a cellular telephone, a Smartphone, and a Personal Digital Assistant (PDA) that has cellular telephone or wireless communication capabilities. In the illustrated embodiment, the mobile communication device 110 is a Smartphone that includes a native application or application 113 (generally, mobile wallet application) downloaded from a source such as the cloud wallet computer 140 for making electronic payments utilizing the mobile communication device 110.

Depending on the type and capabilities of mobile communication device 110 and mobile wallet application 113 utilized, a web browser 114 may execute on the mobile communications device 110 to allow the consumer 110 to navigate screens or pages generated by the mobile wallet application 113, e.g., to select a form of electronic payment such as selecting a credit card 111. Examples of web browsers 114 that may be used for this purpose include, for example, INTERNET EXPLORER, NETSCAPE NAVIGATOR, FIREFOX, OPERA, AVANT Browser, GOOGLE CRHOME, and FLOCK. Non-web browser software that is also capable of displaying payment options and receiving consumer input utilizing the mobile communication device 110 may also be utilized for this purpose. Embodiments may also utilize a dedicated mobile wallet application 113 or other application capable of executing and navigating a mobile wallet application 113. While various mobile communication devices and browsers 114 may be utilized, reference is made to a mobile communication device 110 and mobile wallet application 113 executing thereon.

According to one embodiment, the merchant 125 is an in-store or brick and mortar merchant. In these embodiments, the merchant 125 may utilize an electronic payment device 120 in the form of a Point Of Sale (POS) terminal. According to other embodiments, the merchant 125 utilizes an electronic payment device 120 in the form of a mobile communication device configured for processing electronic transactions so that a transaction involves multiple mobile communication devices. The electronic payment device 120, whether a POS terminal or mobile communication device, includes or accesses a payment program or application 123 for generating transaction data 122 and communicating with the consumer's mobile communication device 110 via a temporary, close proximity or short range connection such as a NFC connection 160.

When using a mobile communication device as the electronic payment device 120, the merchant 125 can be in-store or at a remote location and accept payment using merchant and consumer mobile communication devices. For example, both the consumer 115 and the merchant 125 may be in the merchant store or office, or the consumer 115 and merchant 125 may be at a location other than the merchant store or office, e.g., at various residential, commercial and retail locations, offices, job sites, etc. Further, such mobile merchants 125 can accept payments at various times including at times during which a retail establishment of the merchant 125 is closed. For this purpose, the mobile payment application 152 can be downloaded onto the mobile device, and a web browser may execute on the merchant's mobile communications device to allow the merchant 125 to navigate screens or pages generated by the mobile payment application 123. Embodiments may also utilize a dedicated mobile payment application or other application capable of executing and navigating a mobile payment application 123. Thus, a merchant 125 who utilizes a mobile device for payment is not restricted to operating from a retail establishment. However, since such merchants 125 are mobile, they may conduct business from various locations at various times, including at or near at or near retail establishments during or after business hours. Examples of mobile payment applications 123 that can utilized or configured for use in embodiments include GOPAYMENT, available from Intuit Inc., CHARGE ANYWHERE Mobile POS software, Transaction Wireless and AIR CHARGE. For ease of explanation, reference is made to a consumer's mobile communication device 110 including a mobile wallet application 113 and a merchant's mobile communication device or electronic payment device 120 including a mobile payment application 123, one example of which is GOPAYMENT.

The payment processor 135 provides services of processing transactions involving forms of electronic payment such as a credit card 111 and serves as an intermediary between the consumer 115 and an issuing bank (not illustrated in FIG. 1). The issuing bank acts as a recipient of proceeds of the transaction. For this purpose, the payment processor 135 hosts or manages a merchant account 132 on behalf of the merchant 125. The merchant account 132 allows the merchant 125 to accept payment using a credit card and other forms of payment. Examples of payment processors or payment processing systems 130 that provide these types of services include, for example, Innovative Merchant Solutions (an Intuit Inc. company), CHASE PAYMENTECH and EVALON.

In the illustrated embodiment, the merchant account 132 resides on the payment processor computer 130, but the merchant account 132 may also reside on another computer that is accessed by the payment processor 130. For example, the other computer may host a financial management system (FMS), an example of which is an on-line accounting program such as quickbooks.com, available from Intuit, Inc. A merchant account 132 managed using the FMS can be updated by the payment processor computer 130. Thus, it should be understood that FIG. 1 illustrates one system 100 configuration that may be utilized, and that one or more system components, such as the merchant account 132, may be on different computers and/or on different networks.

The cloud computer, server or resource 140 (generally, cloud server) includes an authorization application or program (generally, authorization program 113) and manages or hosts a database 146 including payment data 147 of respective consumers 115 that can be accessed by mobile communication devices 110 serving as mobile wallets. The "cloud" server may be one or multiple servers, but in the illustrated embodiment, at least one server includes payment data of respective consumers 115, and "cloud" in embodiments refers to the cloud wallet server 140 and the payment processor computer 130 that serve as on-demand resources that may be utilized by various consumers 115 and merchants 125 to process respective electronic transactions.

Examples of networks 150*a-c* that may be utilized for communications between the mobile communication device 110 and the cloud wallet server 140, between the electronic payment device 120 and the payment processor computer 130, and between the payment processor computer 130 and the cloud wallet server 140 include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 150 generally, but various networks 150 and communication methods may be utilized.

Figure 2:
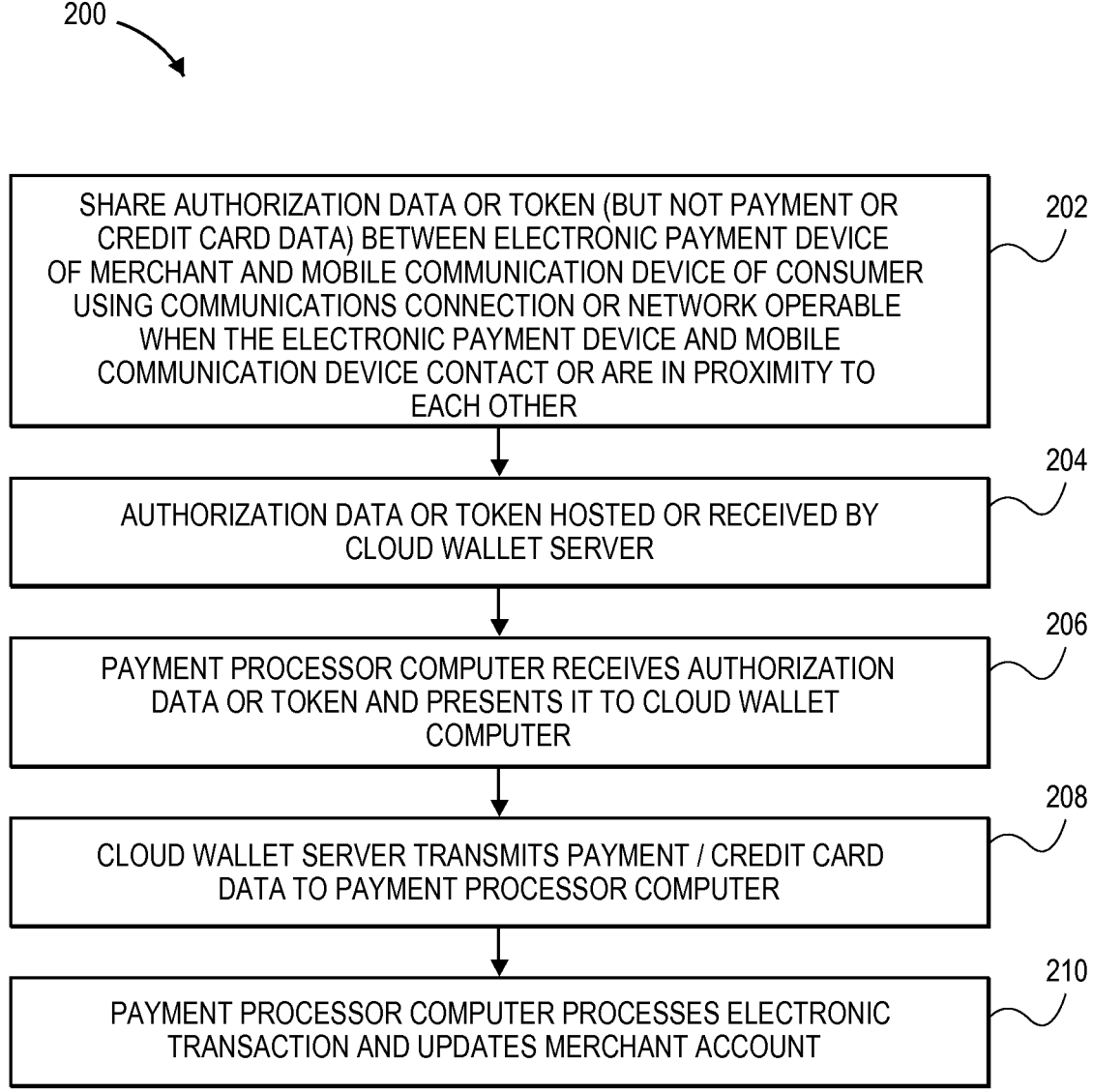
FIG. 2 is a flow diagram of one embodiment of a method for generating an authentication token for use in processing an electronic transaction without providing electronic payment data to a merchant.

Referring to FIG. 2, and with continuing reference to FIG. 1, a method 200 for processing an electronic transaction involving a mobile communication device 110 that serves as a mobile wallet comprises, at 202, the electronic payment device 120 and the mobile communication device 110 sharing a secret or transaction specific authorization data or token 170 (without transmitting credit card data to the merchant 125). According to embodiments, this is accomplished using a near field communications (NFC) 160 or other suitable close proximity connection (generally, NFC). For this purpose, the mobile communication device 110 and the electronic payment device 120 are equipped with respective NFC chips or cards 119, 129 (generally, NFC chip), which are utilized to establish a NFC connection 160 (represented by arrows in FIG. 1) with each other when they are brought together or sufficiently close to each other. According to embodiments, the mobile communication device 110 and electronic payment device 120 communicate with each other using a peer-to-peer configuration so that data can originate from or be generated by either of the mobile communication device 110 or electronic payment device 120 and be transmitted to the other via the NFC connection 160.

Authorization data or an authorization token 170 (generally, authorization token) is generated and shared between the merchant's electronic payment device 120 and the consumer's mobile communication device 110. Use of peer-to-peer communications between the electronic payment device 120 and the mobile communication device 110 is in contrast to certain systems that utilize restrictive or one-way communications (e.g., transmitting a tag from a mobile communication device to a merchant payment device) such that, as described in further detail below, embodiments provide a flexible system architecture that accommodates multi-directional communications between system components such that multiple components may generate an authorization token and transmit the authorization token to other system components for use in processing an electronic transaction.

At 204, the authorization token 170 is transmitted from the mobile communication device 110 to the cloud wallet server 140, and at 206, transmitted from the electronic payment device 120 to the payment processor computer 130, which presents the authorization token 170 to the cloud wallet server 140. At 208, the authorization program 143 of the cloud wallet server 140 looks up the received authorization token 170 in the database 146, identifies the associated data 147 of the credit card 111 of the consumer 115 for which the authorization token 170 was generated, and sends the associated credit card data 147 to the payment processor computer 130 at 208, which then processes electronic transaction, updates merchant account 132 and notifies merchant 125 as necessary at 210. Further embodiments and aspects thereof are described with reference to FIGS. 3-11. Embodiments in which the authorization token 170 is generated by the electronic payment device 120 of the merchant 125 are described with reference to FIGS. 3-6, embodiments in which the authorization token 170 is generated by or using the mobile communication device 110 of the consumer 115 are described with reference to FIGS. 7-8, and embodiments in which the authorization token 170 is generated by the cloud wallet server 140 are described with reference to FIGS. 9-10.

Figure 3:
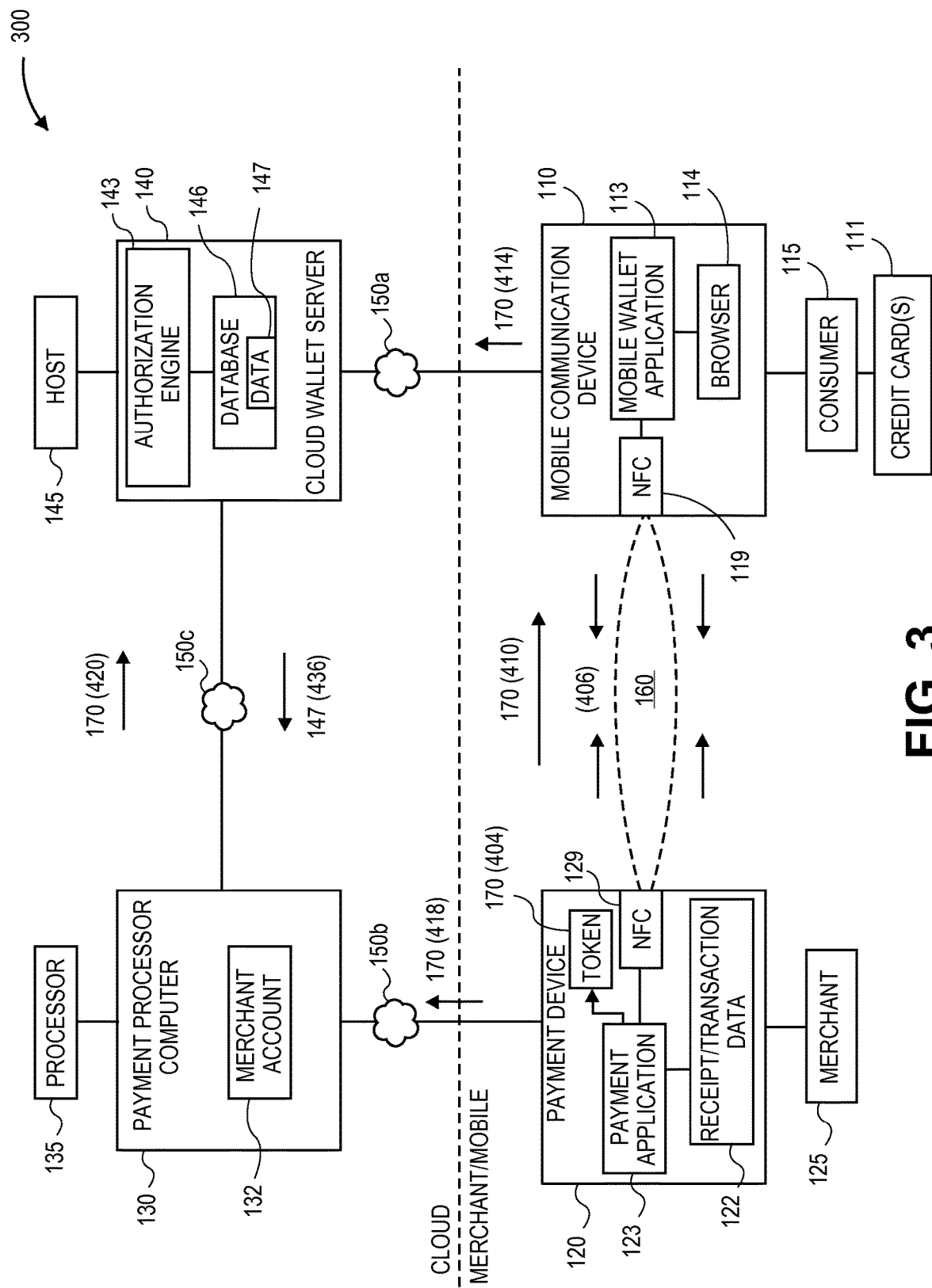
FIG. 3 is a block diagram of a system constructed according to one embodiment in which an authentication token is generated by a payment application executing on an electronic payment device of a merchant that is in communication with a consumer mobile communication device and a payment processor computer for use in processing an electronic transaction without providing electronic payment data to the merchant.

Authorization Token Generated by Electronic Payment Device of Merchant/Payment Application Referring to FIG. 3, a system 300 constructed according to one embodiment comprises or involves one or more or all of the system components described above (aspects of which are not repeated), and the authorization token 170 that is generated by a merchant's electronic payment device 120, e.g., by a payment application or program 125, a controller of the NFC chip 129 or by a separate authorization token generator.

Figure 4:
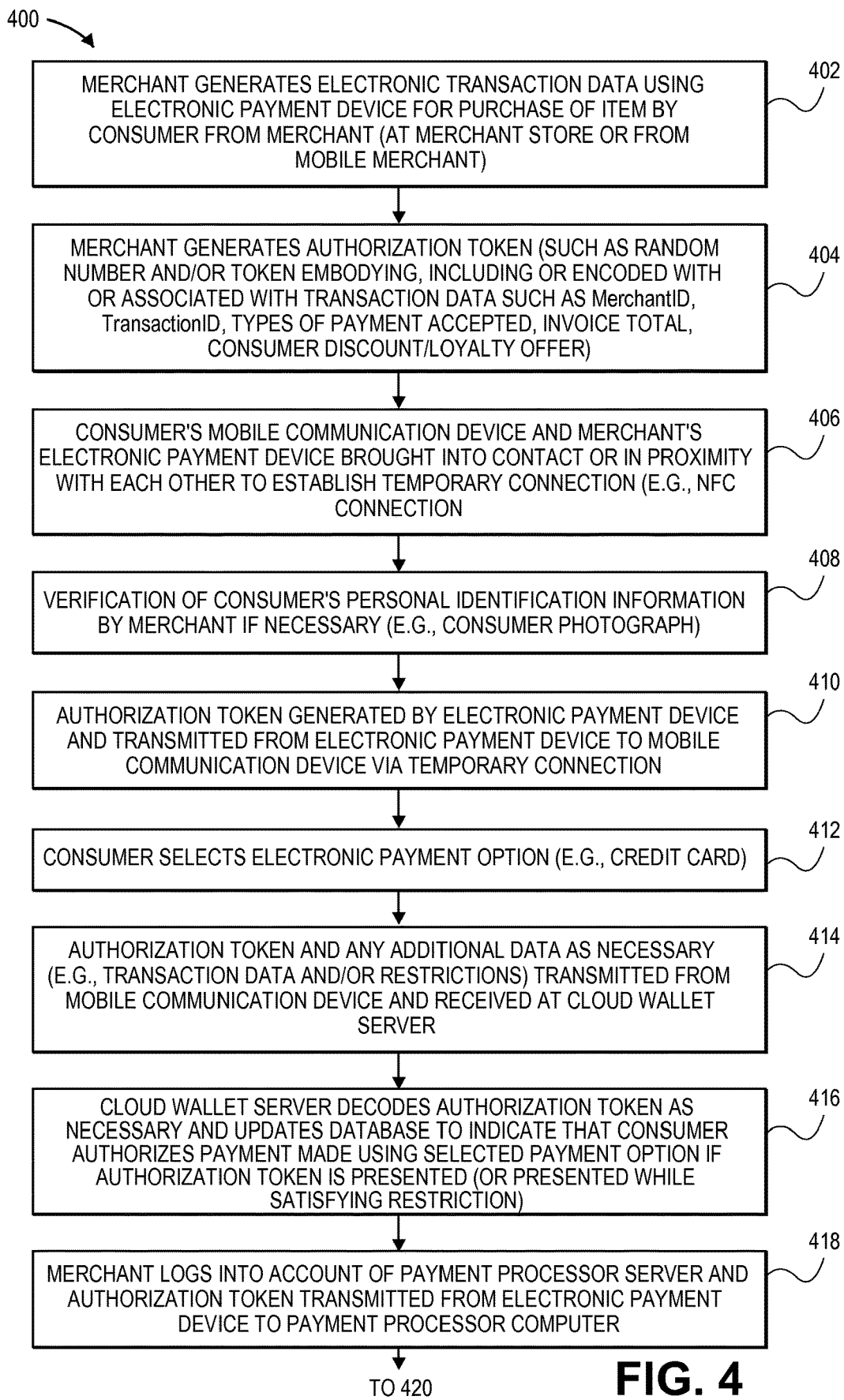
FIG. 4 is a flow diagram of one embodiment of a method for generating an authentication token with an electronic payment device of a merchant for use in processing an electronic transaction without providing electronic payment data to the merchant.
Figure 4:
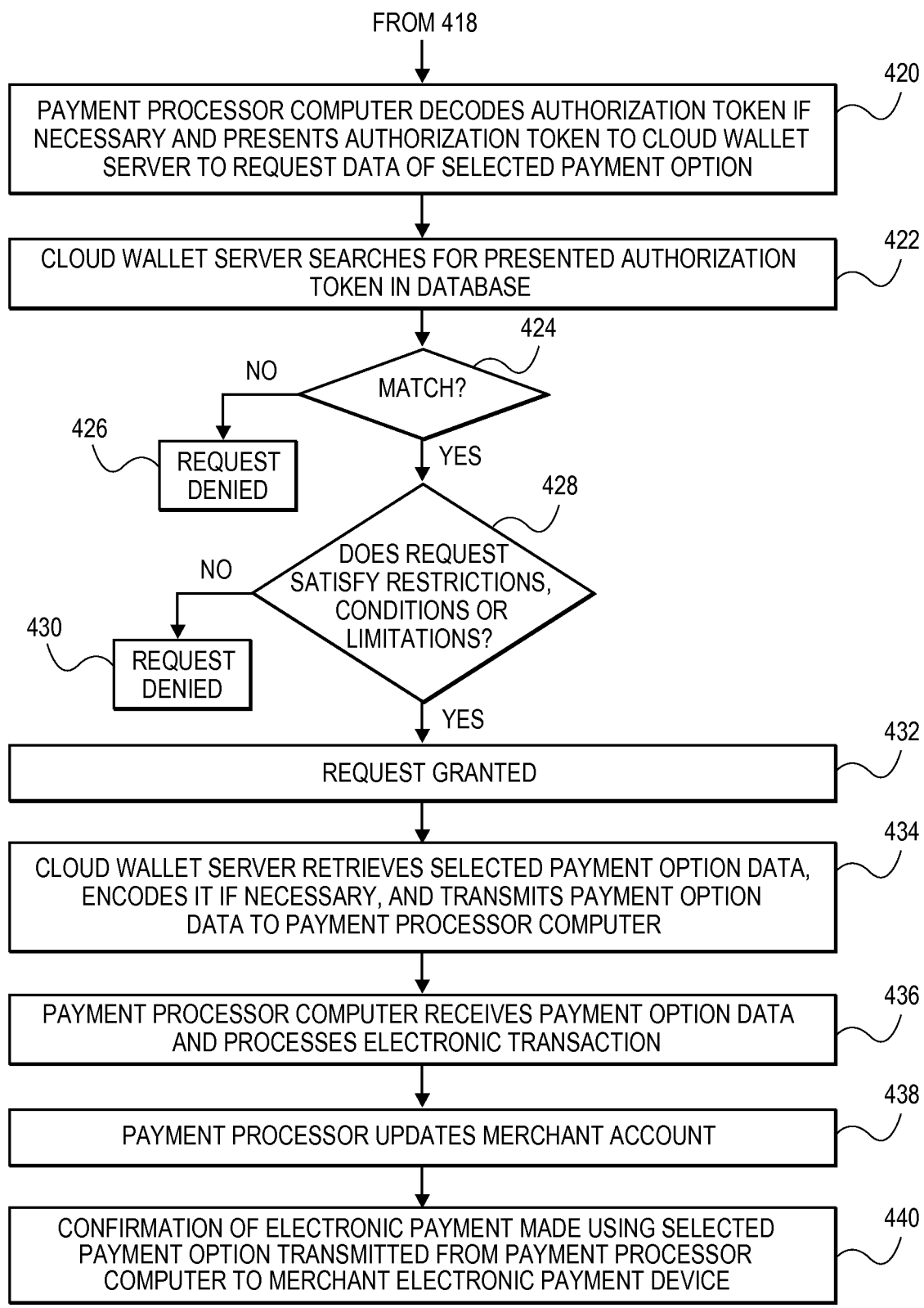

With further reference to FIG. 4, and with continuing reference to FIG. 3, a method 400 for processing an electronic transaction using a merchant-generated authorization token 170 comprises, at 402, the merchant 125 generating invoice, receipt or transaction data 122 using electronic payment device 120 for purchase of item by the consumer 115 from the merchant 125 (at merchant store or from mobile merchant). Examples of transaction data 122 (generally, "transaction data") include merchant identification (MerchantID) (such as a merchant name, store number, location or zip code), a transaction identification (TransactionID), types of electronic payment accepted by the merchant (e.g., VISA, MASTERCARD, AMERICAN EXPRESS, electronic check, debit card, ACH, etc.).

At 404, the payment application 123 executing on the electronic payment device 120 generates an authorization token 170. According to one embodiment, the authorization token 170 is a random number. According to a further embodiment, the authorization token 170 embodies, includes or is encoded with transaction data 122 such as merchant identification (MerchantID) (merchant name, store number, location or zip code or other identifier), a transaction identification (TransactionID), types of electronic payment accepted by the merchant (e.g., VISA, MASTERCARD, AMERICAN EXPRESS, electronic check, debit card, ACH, etc.), an invoice amount and, in certain embodiments, consumer discount/loyalty offers. For example, a discount or loyalty offer may offer a 2% credit or discount to the consumer 115 if the consumer 115 utilizes a credit card 111 of a certain issuer with whom the merchant 125 has a relationship. The credit or discount can be applied in real time during the transaction or issued later (e.g., in the form of a check or credit card credit) after the transaction has been completed.

At 406, the consumer's mobile communication device 110 and the merchant's electronic payment device 120 brought into contact or in proximity with each other to establish a temporary connection, e.g., a NFC connection 160, between the devices so they can communicate with each other. According to one embodiment, the electronic payment device 120 is a stationary POS terminal such that the mobile communication device 110 is brought into contact or in proximity with the POS terminal by the consumer 115. According to another embodiment, the electronic payment device 120 is also a mobile communication device such that one or both of the mobile communication devices may be into contact or in proximity with the other.

At 408, in certain embodiments, the merchant 125 verifies the identity of the consumer 115. For this purpose, a photograph of the consumer 115 may be displayed to the merchant 125 on the merchant's electronic payment device 120 or on the consumer's mobile communication device 110. For example, in one embodiment, the mobile wallet application 115 may be operable to access a photograph stored locally on the mobile communication device 110 after a NFC connection 160 is established. The initial or a new NFC connection may be utilized for this purpose of the photograph is displayed on the merchant's electronic payment device 120.

In another embodiment, the consumer 115 logs into the cloud wallet server 140, which stores the photograph in the database 146 with associated credit card data 147 of the consumer 110, downloads the photograph to the mobile communication device 110, which is then displayed to the merchant 125. Other types of biometric data may also be utilized to verify the identity of the consumer 115 including fingerprints and voice samples acquired at the point of sale, which may be compared with fingerprints and voice samples previously provided by the consumer 115 and stored in the database 146 of the cloud wallet server 140.

In further embodiments, the consumer may also allow contact information to be communicated to the electronic payment device 120 to allow the merchant 125 to communicate with the consumer 115 at a later time, e.g., so that the consumer 115 may receive promotional offers from the merchant 125.

Continuing with FIG. 4, at 410, the payment application 123 executing on the electronic payment device 120 or a controller of the NFC chip 129 if so configured generates the authorization token 170, which is transmitted from the electronic payment device 120 to the mobile communication 110 device via the temporary NFC connection 160. As discussed above with reference to FIGS. 1-2, the authorization token 170 may be a randomly generated number. The authorization token 170 may also be a use token. The authorization token 170, or data transmitted with the authorization token 170, may also indicate or be decoded to indicate transaction data 122, e.g., which types of payment are accepted by the merchant 125.

At 412, the consumer 115 selects an electronic payment option (e.g., selects a credit card, checking account, etc.) based at least in part upon data 122 received from merchant 125 (if merchant specifies types of payment) and electronic payment option data 147 stored locally on mobile communication device 110 indicating which credit cards can be used, or by logging into consumer account hosted by the cloud wallet server 140 and accessing stored electronic payment options. For example, referring to FIG. 5, the consumer may execute the mobile wallet application 113, which generates a screen 500 displayed on the mobile communication device 110 with images or representations of the available payment options (e.g., credit cards 111a-c) that can be selected for payment. In the illustrated example, three credit cards 111 are displayed, but it will be understood that the consumer 110 may have other numbers of credit cards, other forms of electronic payment and combinations of electronic payments may be presented to the consumer 115.

Referring again to FIGS. 3-4, at 414, the authorization token 170 and any additional data as necessary (e.g., transaction data 122 such as one or more of MerchantID, TransactionID, accepted payment options, invoice amount), are transmitted from mobile communication device 110 to the cloud wallet server 140 via network 150 and received at the cloud wallet server 140.

According to one embodiment, the authorization token 170 as generated by the merchant's electronic payment device 120 is transmitted to the cloud wallet server 140 through the mobile communication device 140. In other embodiments, the payment application 123 executing on the electronic payment device 120 or the mobile wallet application 113 executing on the mobile communication device 110 transforms or encodes the merchant-generated authorization token. The encoded authorization token 170 may embody or be encoded with transaction data 122, and may be decoded by the cloud wallet server 140 using an appropriate key or decoding mechanism. The ability to encode and decode the authorization data provides for more flexibility and inclusion of additional information associated with the merchant 125 and/or transaction to ensure that the credit card data 147 to be utilized is utilized for payment is for the correct amount, e.g., if the invoice or receipt amount 122 is encoded within or transmitted with the authorization token 170, and that the payment request is for a particular merchant 125 for that specified amount. Further, use of single-use authorization tokens 170 that are dynamically generated for a particular transaction provide for enhanced security compared to systems that assign and utilize the same data or tag to a consumer's mobile communication device 110 since loss or theft of that data or tag may result in fraudulent activity.

At 416, the cloud wallet server 140 decodes the authorization token 170 if necessary and updates database 146 to indicate that consumer 115 authorizes payment made using selected payment option if that authorization token 170 is presented (or presented while satisfying pre-determined restrictions, conditions or limitations).

For example, referring to FIG. 6A, the cloud wallet server 140 may store data 147 of credit cards or other forms of electronic payment of various consumers 115. With credit cards, the credit card data may include one or more or all of the name of an issuer bank, a credit card number, expiration date, name as it appears on the credit card, and card verification code (CVC).

In the illustrated example, the cloud wallet server database 146 includes a table 600 having a columns 602a-602e identifying consumers 115 and data 147 of their respective options for electronic payment. For example, the data 147 includes data (e.g., one or more of credit card number, expiration date, cardholder name, credit verification code, etc.) of three credit cards (CC1-3) for Consumer 1, data of one credit card (CC4) for Consumer 2, and data of two credit cards (CC5-6) for Consumer 3. The database 146 may also store data 147 of other types of electronic payment that may be utilized such as electronic check data, ACH and other data.

FIG. 6B further illustrates the database 146 including a table 610 structured for a particular consumer 115 to include columns indicating which authorization token 170 has been received for a particular payment option, and associated authorization token restrictions and transaction data 122. For example, column 612a includes data specifying a consumer's payment option, e.g., credit cards, column 612b indicates that the cloud wallet server 140 has received authorization tokens 170 from the consumer's mobile communication device 110 for some, but not all of the credit cards. Column 612c indicates a transaction, invoice or receipt amount authorized to be charged on a credit card as determined by data transmitted with the authorization token 170 or when the authorization application 143 decoded an authorization token encoded with that data. Data in column 612d indicates when a token 170 was generated, and data in column 612e indicates the time the token 170 is valid such that the token 170 would have to be presented by a payment processor 130 within that time (e.g., 10 minutes, 30 minutes, 60 minutes) to request credit card data 147, as explained in further detail below. Column 612f identifies the merchant for whom credit card data 147 can be released for payment.

It will be understood that table 610 may include some or all of these types of data for all or some of various types of electronic payment options, and that the table 610 is provided as an example of how embodiments may be implemented. For example, while FIG. 6B illustrates a table 610 including data of a condition, restriction or limitation of a time during which an authorization token 170 is valid, other or additional conditions, restrictions and limitations may be imposed and recorded in the database 146.

Referring again to FIGS. 3-4, after generating the authorization token 170, at 418, the merchant 125 logs into an account with the payment processor computer 130 if necessary, and transmits the authorization token 170 from the electronic payment device 120 to the payment processor computer 130. At 420, the payment processor computer 130 decodes authorization token if necessary, authenticates itself to the cloud wallet server 140 as necessary, and transmits and presents the authorization token 170 to the cloud wallet server 140 to request data 147 of the credit card 111 selected by the consumer 115.

At 422, the authorization application or program 143 of the cloud wallet server 140 searches the database 146 (e.g., tables 600, 610 shown in FIGS. 6A-B) for data 147 linked to or associated with the authorization token 170 received from the payment processor computer 130. At 424, the authorization application or program 143 determines whether the authorization token 170 received from payment processor computer 130 matches an authorization token 170 that was received from the consumer's mobile communication device 100 and stored in the database 146. If not, then the payment processor's request is denied at 426, no credit card data 147 is provided by the cloud wallet server 140 to the payment processor computer 130.

If so, then proceeding to FIG. 4, 428, the authorization engine 143 of the cloud wallet server 140 determines whether the authorization token 170 received from the payment processor computer 130 satisfies restrictions, conditions or limitations. If not, then at 430, the payment processor's request is denied, no credit card data 147 is provided by the cloud wallet server 140 to the payment processor computer 130. If so, then at 432, the cloud wallet server 140 proceeds to 434 and retrieves data 147 (e.g., one or more of issuer bank name, credit card number, cardholder name, expiration date, CVD data etc.) of the elected payment option, encodes retrieved data 147 if necessary, and transmits selected payment option data 147 to the payment processor computer 130.

For example, FIG. 4, 428, may involve the authorization token 170 being generated at 1:00 pm, and a restriction specifies that the token 170 is valid for only one hour and thus must be presented by the payment processor computer 130 within that time. If the payment processor computer 130 presents an authorization token 170 that matches a token 170 provided by the mobile communication device 110, and it was presented within the one hour time frame, then the cloud wallet server 140 returns data 147 of the credit card 111 associated with that valid authorization token 170, and the database can be updated to reflect that a valid authorization token 170 was presented and credit card data 147 was sent to the payment processor 130. This ensures that the authorization token 170 that is generated is only valid for a limited time and thus reduces the chance that the same authorization token 170 may be utilized again or for a fraudulent purchase.

According to another embodiment, the authorization token 170 received at the cloud wallet server 140 from the mobile communication device 110 can be encoded with or be transmitted with data indicating an amount of an invoice or receipt. When the payment processor 130 presents the authorization token 170 to the cloud wallet server 140, the cloud wallet server 140 may return data 147 of the credit card 111 associated with that valid authorization token 170 and authorize a charge for that specified invoice or receipt amount. Or, the invoice or receipt amount may be transmitted as part of or with the authorization token 170 to the payment processor 130, which transmits the same authorization token 170 and/or invoice amount to the cloud wallet server 140. If the authorization engine 143 determines that the invoice amount received from the payment processor computer 130 and the invoice amount received from the mobile communication device 110 match, then data 147 of the credit card 111 for that authorization token 170 can be sent by the cloud wallet server 140 to the payment processor computer 130. If they do not match, then data 147 of the credit card 111 for that authorization token 170 is not provided to the payment processor 135. In these cases, the payment processor 135 may inquire with the merchant 125 regarding the discrepancy. Thus, embodiments ensure that the correct amount is charged to the consumer's credit card 111, and neither the merchant 125 nor the payment processor 135 can charge an incorrect or higher amount after the consumer 115 has left the merchant 125 or merchant store.

In yet another embodiment, the restriction or limitation can be based on an identification (e.g., name or store number) and/or location of the merchant 125 so that the cloud wallet server 140 authorizes use of credit card data 147 for that identified merchant or location. In these embodiments, the authorization token 170 may have been encoded with or transmitted with data specifying that the authorization token 170 is valid for payment made to a particular merchant 125 identified by name, store number, location or other identifying data, and that presentation of the authorization token 170 on behalf of another merchant would not be accepted.

Embodiments may involve one or multiple types of restrictions, conditions or limitations and combinations thereof, and such data may be stored in table 610 or other table or data structure of database 146. For example, embodiments may involve a time during which the authorization token 170 is valid and must be presented, an invoice amount, a merchant identification, both a time the authorization token 170 is valid and an invoice amount, both a time the token is valid and a merchant identification, both an invoice amount and a merchant identification, all of a time the authorization token 170 is valid, invoice amount and merchant identification, and other types, numbers and combination of restrictions. Further, it will be understood that depending on the type of restriction, the restriction may be selected by the authorization engine 143 according to a pre-determined standard or selected or specified by the consumer 115 as part of the process when the consumer 115 selects a credit card 111 to utilize. It will also be understood that such restrictions may be encoded within the authorization token 170, which is decoded by the authorization engine 143 to determine the restrictions, transmitted with the authorization token 170 that is encoded with other data, or transmitted with an unencoded or unmodified authorization token 170 as generated by the merchant 115.

Referring again to FIGS. 3-4, if the authorization token 170 matches a token stored in the database 146, and the token 170 satisfies any restrictions such that at 434, the cloud wallet server 140 transmits selected payment option data 147 to the payment processor computer 130, then at 436, the payment processor computer 130 receives the data 147 and decodes it if necessary, and processes the electronic transaction. At 438, the merchant account 132 is updated and a confirmation is sent to the electronic payment device 120 at 440.

Figure 7:
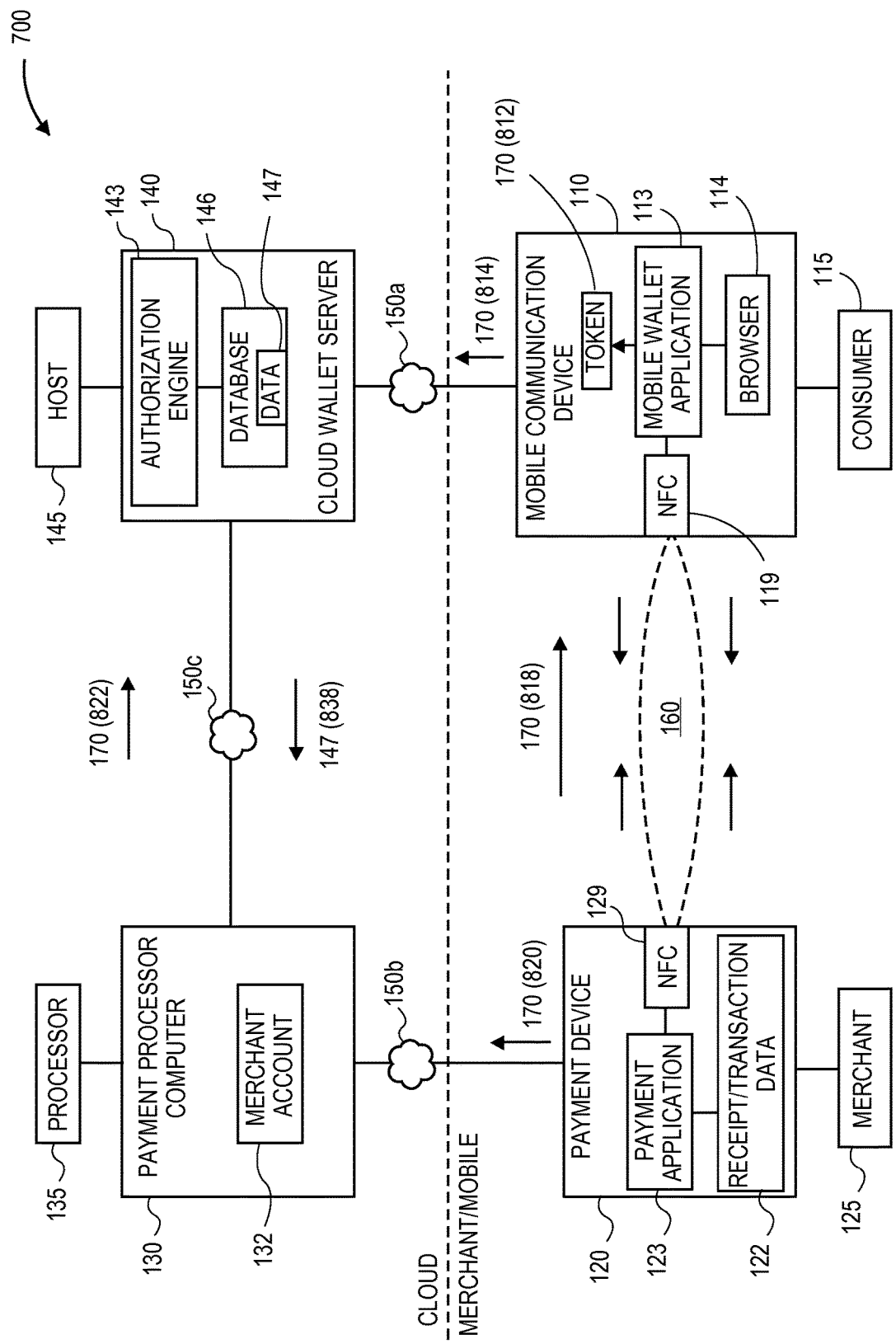
FIG. 7 is a block diagram of a system constructed according to one embodiment in which an authentication token is generated by a mobile wallet application executing on a mobile communication device of a consumer that is in communication with a cloud resource or computer and an electronic payment device of a merchant for use in processing an electronic transaction without providing electronic payment data to the merchant.
Figure 8:
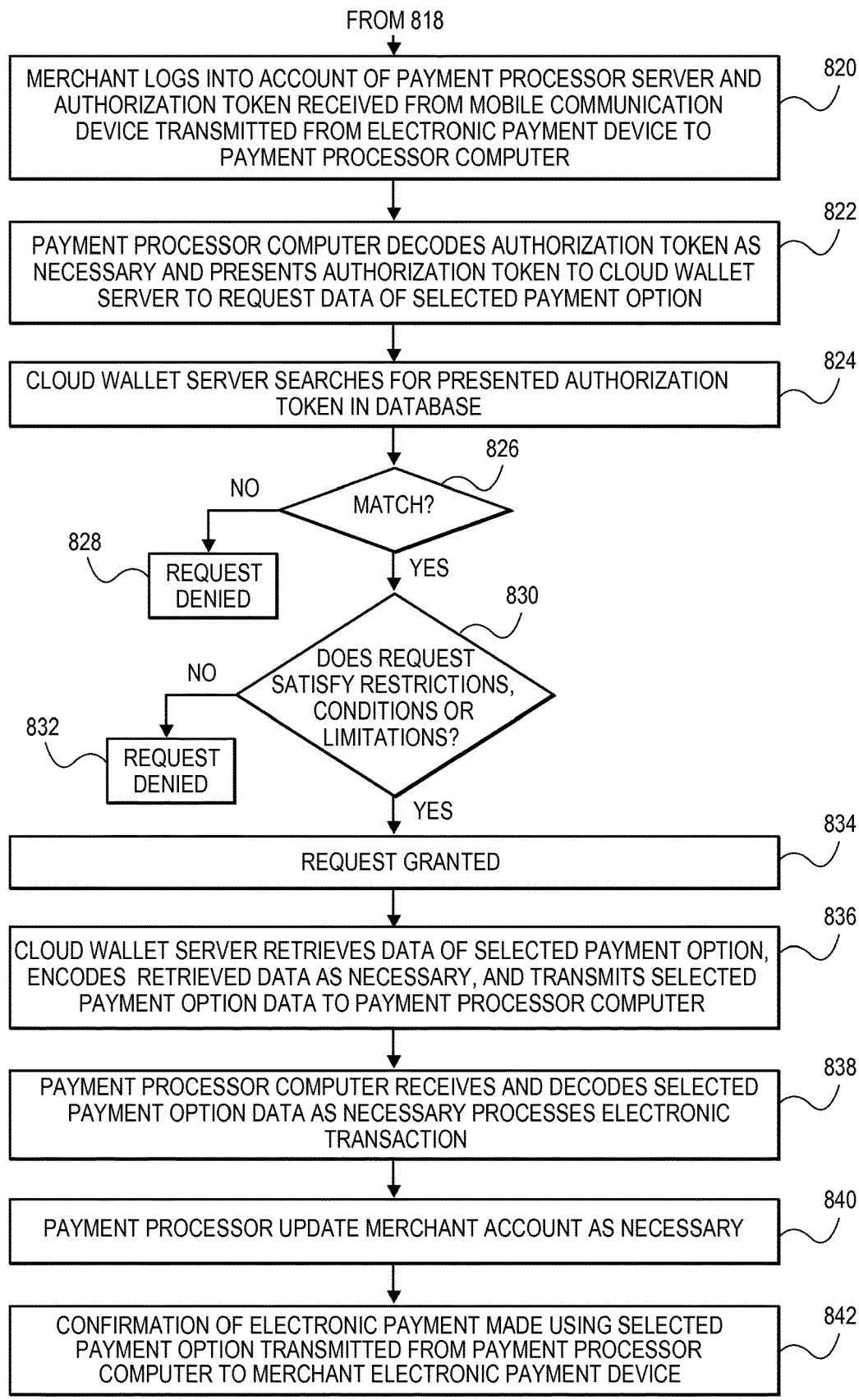
FIG. 8 is a flow diagram of one embodiment of a method for generating an authentication token with a mobile communication device of a consumer for use in processing an electronic transaction without providing electronic payment data to the merchant.

Authorization Token Generated Using Mobile Communication Device Of Consumer/Mobile Wallet Application Referring to FIGS. 7-8, a system 700 constructed according to another embodiment comprises or involves system components described above (aspects of which and embodiments are not repeated), and is utilized to execute a method 800 for processing an electronic transaction using authorization token 170 generated by a consumer's mobile communication device 110. It will be understood that various aspects of the system 300 and method 400 described above also apply to the system 700 and method 800 described with reference to FIGS. 7-8, and thus are not repeated in full detail. Further, it will be understood that while certain embodiments are described with reference to certain steps performed in a certain order or at a certain stage of a method, other steps may be performed in different orders and at different method stages.

Figure 5:
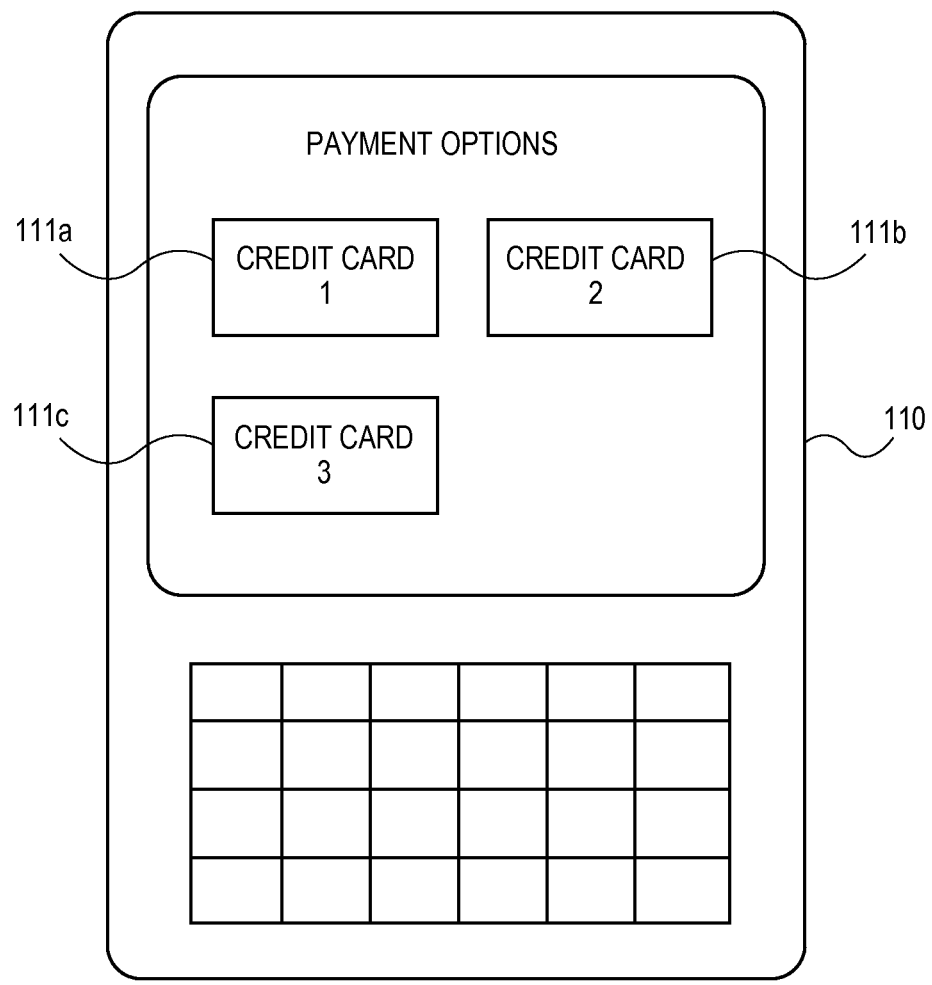
FIG. 5 generally illustrates a display generated by a mobile payment application to allow a consumer to select which form of electronic payment should be utilized for payment to a merchant and generation of an authorization token.

In the illustrated embodiment, the method 800 comprises bringing the consumer's mobile communication device 110 and merchant's electronic payment device 120 into contact or in proximity with each other to establish a temporary connection (e.g., a NFC connection 160 as discussed above) between the mobile communication device 110 and electronic payment device 120. At 804, the consumer 115 may by verified by the merchant 125, e.g., based on personal identification information of the consumer 115 such as a photograph or other biometric data acquired or displayed at the point of sale. At 806, the merchant 125 generates data 122 of an invoice or receipt that includes one or more types of electronic transaction data such as MerchantID, TransactionID, Types of Payment Accepted, Invoice Total and consumer discount/loyalty offer. At 808, the transaction data 122 is transmitted from the electronic payment device 120 to mobile communication device 110 via the same or a new NFC connection 160, and at 810, the mobile wallet application 113 displays a list of available payment options to the consumer 115 (e.g., as shown in FIG. 5) so that the consumer 115 selects an option (e.g., selects a credit card, checking account, etc. accepted by merchant). The consumer's selection may be based at least in part upon one or more of data received from electronic payment device 120 (if merchant 125 specified an acceptable form of payment) and electronic payment option data 147 stored locally on mobile communication device 110 or accessed by logging into consumer account hosted by cloud wallet server 140. At 812, an authorization token 170 (such as random number and/or token embodying, including or encoded with or associated with one or one of transaction data and selected payment option data) is generated by the mobile wallet application 113 executing on mobile communication device 110, and at 814, the token 170 and additional data (e.g., selected payment option and authorized payment/invoice amount and restrictions, conditions or limitations as necessary) are transmitted from the mobile communication device 110 and received at cloud wallet server 140 via network 150.

At 816, the authorization engine 143 decodes the authorization token 170 if necessary and updates the database 146 to indicate that consumer 115 authorizes payment made using selected payment option upon presentation of the received authorization token 170 (or presented while satisfying pre-determined restrictions, conditions or limitations as discussed above with reference to FIG. 6B). At 818, the authorization token 170 generated by the mobile communication device 110 and any additional merchant for transaction data as necessary (e.g., selected payment option and authorized payment/invoice amount and restrictions, conditions or limitations) are transmitted from the mobile communication device 110 and received at electronic payment device 120 of the merchant 125 using the same or new NFC connection 160.

At 820, the merchant 125 logs into an account at the payment processor computer 130, and the authorization token 170 received from the mobile communication device 110 is transmitted from the electronic payment device 120 to the payment processor computer 130, which decodes the authorization token 170 if necessary and presents the authorization token 130 to the cloud wallet server 140 to request data 147 of selected payment option at 822. At 824, the authorization engine 143 of the cloud wallet server 140 searches the database 146 to determine, at 826, whether there is a match in the database 146. If the authorization token 170 is not located, there is no match at 828 and the request for credit card data 147 is denied. If the presented authorization token 170 is located in the database 146, there is a match, and at 830, the authorization engine 143 determines whether the request satisfies any restrictions, conditions or limitations. If not, then at 832, the request for credit card data 147 is denied. If so, then the request is granted at 834, and at 836, the authorization engine 143 retrieves data 147 of the selected credit card 111 from the database 146, encodes the data 147 if necessary, and transmits the data 147 to the payment processor computer 130 at 836. At 838, the payment processor computer 130 receives the credit card data 147, decodes it if necessary, and processes electronic transaction. The merchant account 132 is updated at 840, and confirmation of the electronic payment is sent from the payment processor computer 130 to the merchant electronic payment device at 842.

Authorization Token Generated by Cloud Wallet Server/Cloud Wallet Application

Figure 9:
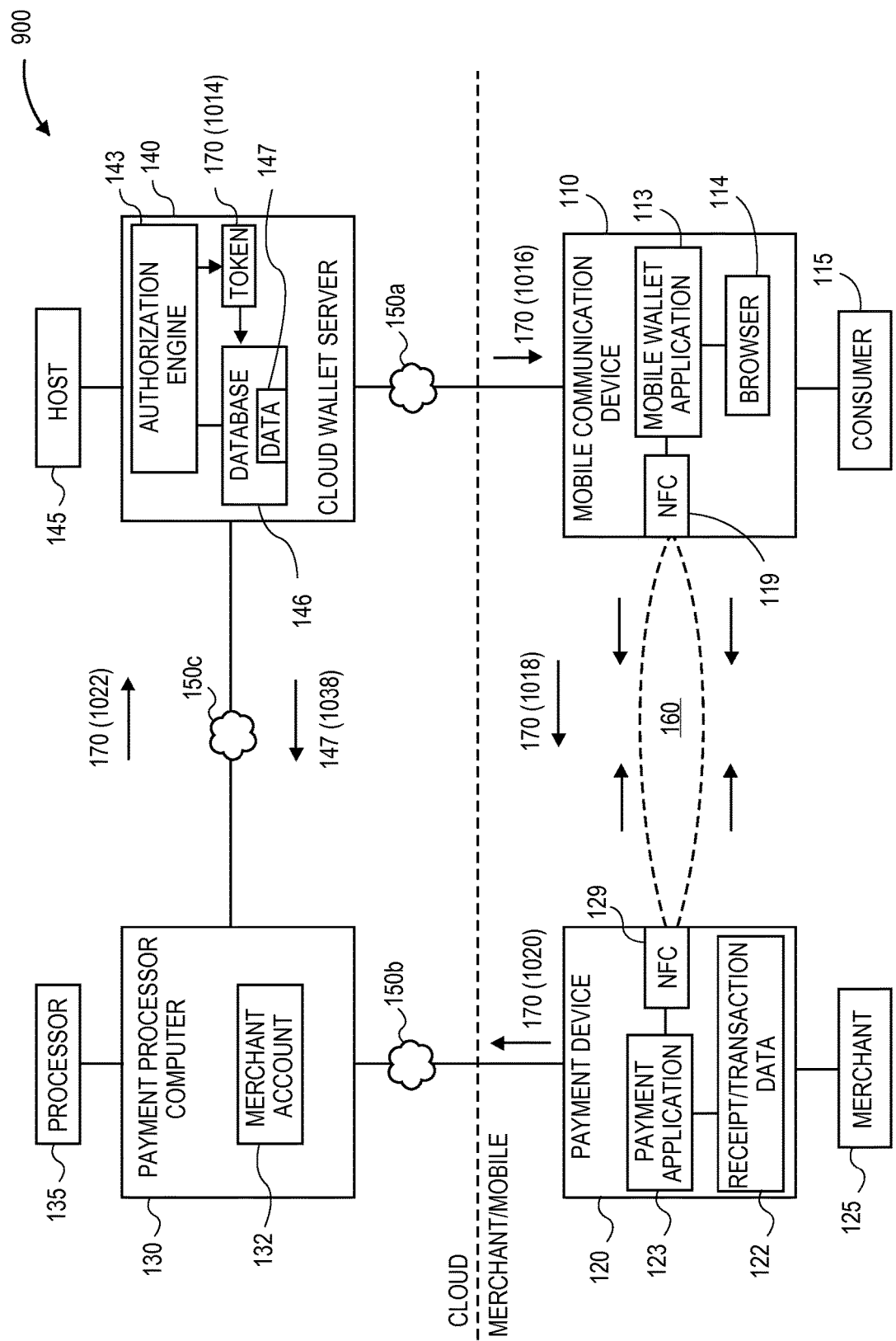
FIG. 9 is a block diagram of a system constructed according to one embodiment in which an authentication token is generated by a cloud computer or resource that is in communication with a mobile communication device of a consumer and a payment processor computer for use in processing an electronic transaction without providing electronic payment data to a merchant.
Figure 10:
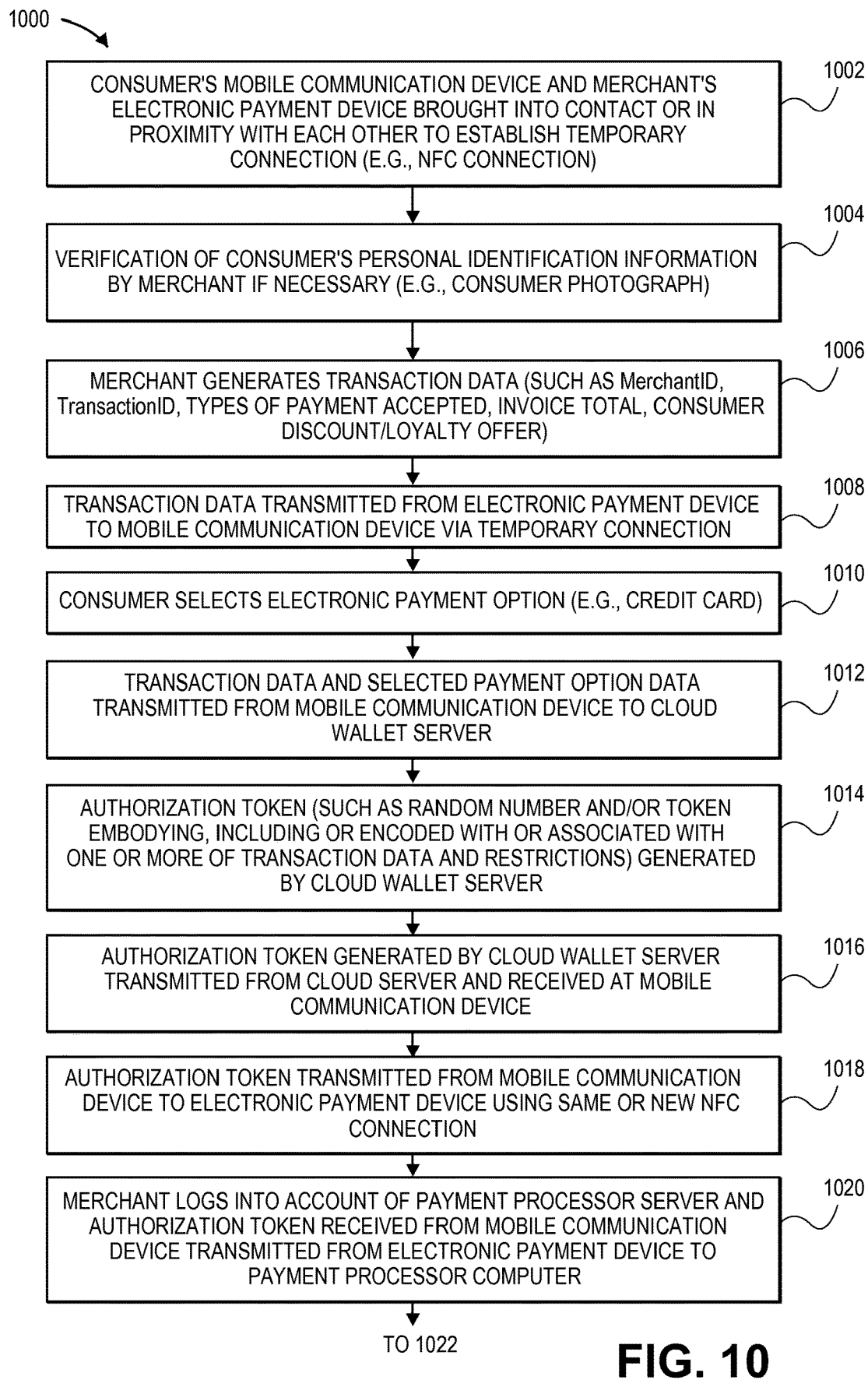
FIG. 10 is a flow diagram of one embodiment of a method for generating an authentication token with a cloud resource or computer for use in processing an electronic transaction without providing electronic payment data to the merchant.
Figure 10:
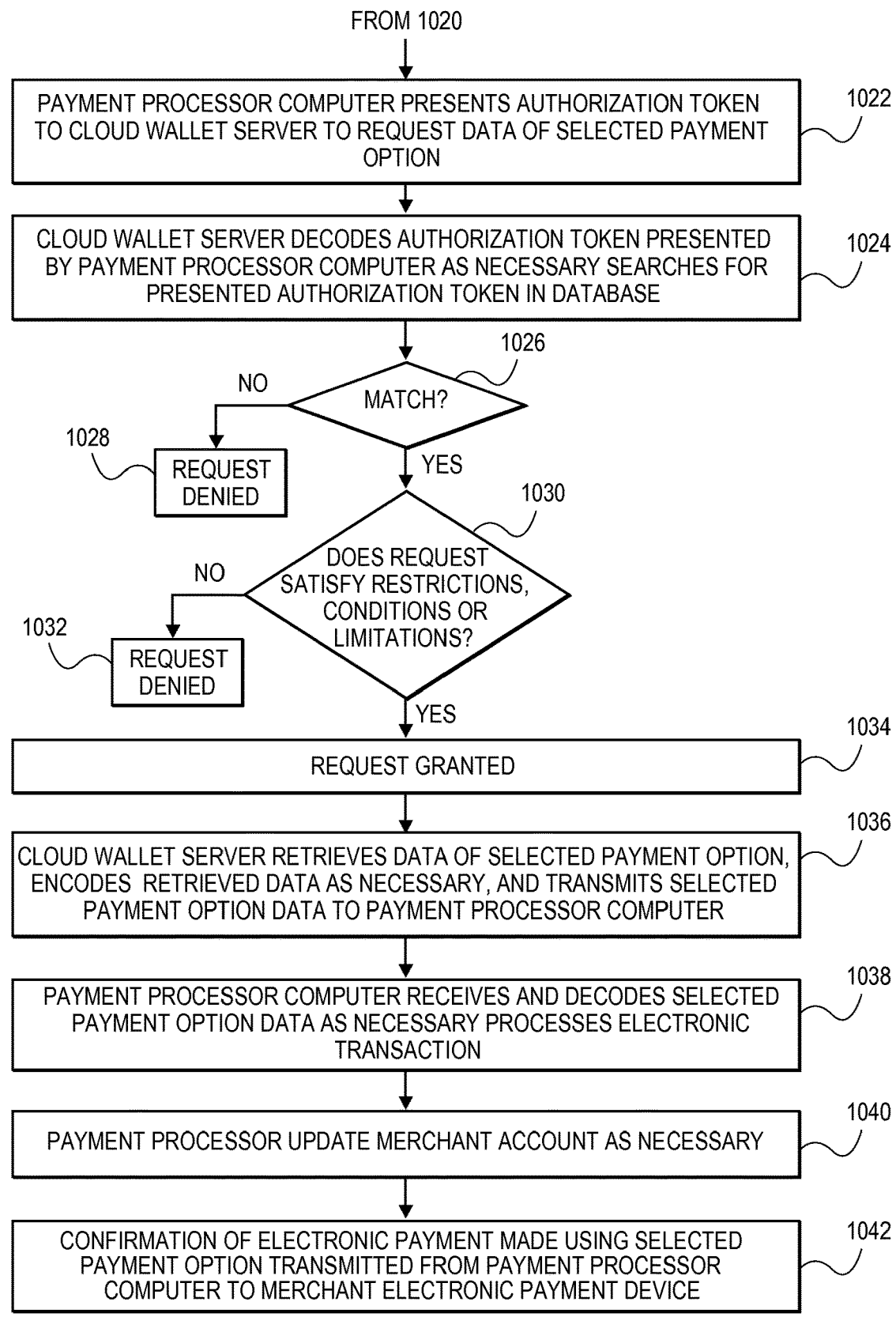

Referring to FIGS. 9-10, a system 900 constructed according to another embodiment comprises or involves system components described above (aspects of which and embodiments are not repeated), and is utilized to execute a method 1000 for processing an electronic transaction using authorization token 170 generated by a cloud wallet server 140. It will be understood that various aspects of the systems 300, 700 and methods 400,800 described above also apply to the system 900 and method 1000 described with reference to FIGS. 9-10, and thus are not repeated in full detail. Further, it will be understood that while certain embodiments are described with reference to certain steps performed in a certain order or at a certain stage of a method, other steps may be performed in different orders and at different method stages.

In the illustrated embodiment, the method 1000 comprises, at 1002, the consumer's mobile communication device 110 and merchant's electronic payment device 120 brought into contact or in proximity with each other to establish temporary connection (e.g., NFC connection 160 between the mobile communication device 110 and the electronic payment device 120. At 1004, the merchant 125 may verify the identity of the consumer 115 using a photograph or other biometric data acquired or displayed at the point of sale. At 1006, the merchant 125 generates electronic receipt, transaction data 122 that may include one or more of MerchantID, TransactionID, Types of Payment Accepted, Invoice Total, and a consumer discount/loyalty offer, and at 1008, the data 122 is transmitted from the electronic payment device 120 to the mobile communication device 110 via the NFC connection 160. At 1010, the mobile wallet application 113 displays possible payment options to the consumer 115 (e.g., as described with reference to FIG. 5) who selects an option, e.g., a particular credit card.

At 1012, the transaction data 122 if applicable and the selected payment option are transmitted from the mobile communication device 110 to cloud wallet server 140, and the authorization engine 143 generates an authorization token 170 at 1014. The authorization token generated by the authorization engine 143 is transmitted from the cloud wallet server 140 via network 150 to the mobile communication device 110 at 1016.

At 1018, the authorization token 170 is transmitted from the mobile communication device 110 to the electronic payment device 120 using the same or new NFC connection 160, and at 1020, the merchant 125 logs into an account at the payment processor computer 130 if necessary. The authorization token 170 received from the mobile communication device 110 is transmitted from the electronic payment device 120 to the payment processor computer 130, which presents the authorization token 170 to the cloud wallet server 140 at 1022 to request data 147 of the credit card 111 selected by the consumer 115. At 1024, the authorization engine 143, which generated the authorization token 170, decodes the authorization token 170 if necessary and searches the database 146 for a match at 1026. If not, the payment processor's request is denied at 1028. If so, then at 1030, the authorization engine 143 determines whether the request by the payment processor 130 satisfies any restrictions, conditions or limitations (generally, restrictions) such as one or more of a time restriction during which the authorization token is valid, payment of a specified amount, and payment to a particular merchant, as discussed above. If the restriction is not satisfied, then at 1032, the request is denied, but if satisfied, at 1034, the request is granted, and at 1036, the authorization engine 143 retrieves data 147 of selected credit card 111, encodes the data 147 if necessary, and transmits the data 147 to payment processor computer 130. At 1038, the payment processor computer 130 receives the requested credit card data 147, decodes it if necessary, and processes the electronic transaction. At 1040, the payment processor computer 130 updates the merchant account 132 as necessary, and at 1042, sends a confirmation to merchant electronic payment device 120 that the transaction has been completed.

Figure 11:
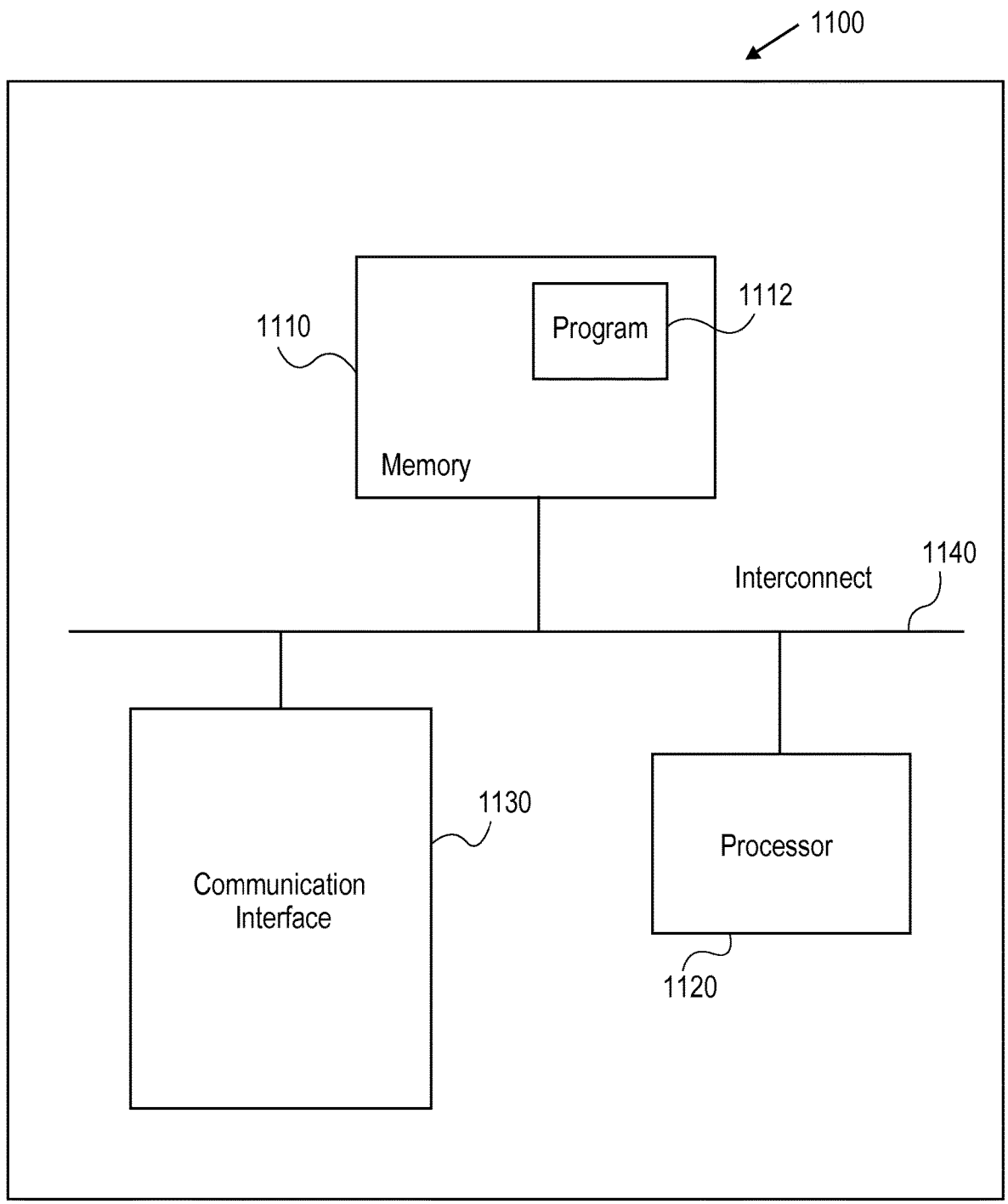
FIG. 11 is a block diagram of components of a computing apparatus in which embodiments may be implemented or that may be utilized in or by embodiments.

FIG. 11 generally illustrates components of a computing device 1100 that may be utilized to execute embodiments and that includes a memory 1110, program instructions 1112, a processor or controller 1120 to execute program instructions 1112, a network or communications interface 1130, e.g., for communications with a network or interconnect 1140 between such components. The memory 1110 may be or include one or more of cache, RAM, ROM, SRAM, DRAM, RDRAM, EEPROM and other types of volatile or non-volatile memory capable of storing data. The processor unit 1120 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1140 may include a system bus, LDT, PCI, ISA, or other types of buses, and the communications or network interface may, for example, be an Ethernet interface, a Frame Relay interface, or other interface. The network interface 1130 may be configured to enable a system component to communicate with other system components across a network which may be a wireless or various other networks. It should be noted that one or more components of computing device 1100 may be located remotely and accessed via a network. Accordingly, the system configuration provided in FIG. 11 is provided to generally illustrate how embodiments may be configured and implemented.

Method embodiments or certain steps thereof, may be embodied in a computer program product such as an application that can be downloaded to an electronic payment device of the merchant, to a mobile communication device of the merchant, and to a mobile communication device of the consumer. Method embodiments or certain steps thereof may also be carried out by execution of software instructions that are embodied in, or readable from, a tangible medium or computer-readable medium or carrier or article of manufacture, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1120 performs steps or executes program instructions 1112 within memory 1110 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, certain embodiments are described with reference to GOPAYMENT as one example of a mobile payment application that may be used by a merchant to accept payment using a mobile communication device, but it should be understood that other mobile payment applications may be used, and that embodiments may be implemented by modifying mobile payment applications such as GOPAYMENT or by providing embodiment as an add-on or separate application for use with an existing mobile payment application.

Moreover, while embodiments are described with reference to a credit card transaction and providing credit card data to a payment processor depending on the authorization token presented, embodiments may involve various types of electronic payment such as debit, ATM and gift cards, eCheck, PAYPAL, etc.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for processing data related to an electronic transaction involving a consumer and a merchant, the method comprising:
    an electronic payment device of the merchant generating authorization data embodying data of a transaction involving the consumer and the merchant;
    establishing a near field communication connection between the electronic payment device of the merchant and a mobile communication device of the consumer when the electronic payment device and the mobile communication device are in contact with or located in proximity to each other;
    the electronic payment device transmitting the authorization data to the mobile communication device through the near field communication connection, wherein the authorization data is transmitted from the mobile communication device through a first network to a first computer hosting data of electronic payment instruments a plurality of consumers; and
    the electronic payment device transmitting the authorization data generated by the electronic payment device through a second network to a second computer of an electronic payment processor, wherein the authorization data generated by the electronic payment device is presented by the second computer to the first computer to request electronic payment data of the consumer associated with the authorization data, the mobile communication device serves as a mobile wallet without transmitting data of an electronic payment instrument utilized by the consumer to the electronic payment device, and the authorization data is to be used by the first computer to determine whether payment to the merchant should be authorized to complete the transaction involving the mobile communication device.

2. The method of claim 1, the authorization data being encoded with the transaction data.

3. The method of claim 2, the authorization data being encoded with transaction data comprising at least one of a merchant identification, a transaction identification, a transaction amount, and accepted electronic payment instruments.

4. The method of claim 2, wherein the authorization data is decoded by the first computer to determine electronic payment instrument data corresponding to the authorization data, the determined electronic payment instrument data being transmitted from the first computer to the second computer.

5. The method of claim 1, the transaction data comprising at least one of a merchant identification, a transaction identification, a transaction amount, and accepted electronic payment instruments.

6. The method of claim 1, the electronic payment device comprising a mobile communication device of the merchant and including a mobile payment application executing thereon, the mobile communication devices of the consumer and the merchant being utilized to establish the near field communication connection.

7. The method of claim 6, the mobile communication device of the merchant comprising a Smartphone.

8. The method of claim 6, the mobile communication devices of the consumer and the merchant being at a location that is remote relative to a store or office of the merchant when the near field connection is established.

9. The method of claim 1, the electronic payment instrument data being received at the second computer in response to presenting the authorization data generated by the electronic payment device to the first computer, the second computer hosting or accessing a merchant account on behalf of the merchant to process the electronic transaction using the received electronic payment instrument data.

10. The method of claim 1, the electronic payment device and the mobile communication device being connected to each other in a peer to peer configuration.

11. The method of claim 1, the authorization data generated by the electronic payment device being dynamic such that first authorization data generated for a first purchase by the consumer is different than second authorization data generated for a second purchase by the consumer.

12. The method of claim 1, the authorization data generated by the electronic payment device comprising an authorization token.

13. The method of claim 12, the authorization token being usable for a single electronic transaction.

14. The method of claim 12, the authorization token being valid to request electronic payment instrument data for a limited time.

15. The method of claim 1, the mobile communication device of the consumer comprising a mobile wallet, and the first computer comprising a cloud computing resource accessible by the plurality of consumers and payment processors.

16. The method of claim 1, further comprising the electronic payment device transmitting to the mobile communication device, through the near field communication connection, an incentive or advertisement related to an electronic payment instrument available to be selected by the consumer using the mobile communication device.

17. The method of claim 16, the incentive or advertisement comprising a coupon or discount if the consumer utilizes a credit card of a pre-determined issuer bank.

18. The method of claim 1, the electronic payment instrument utilized by the consumer comprising a credit card.

19. The method of claim 1, the electronic payment device transmitting the authorization data to the second computer of an electronic payment processor hosting a merchant account on behalf of the merchant, the merchant account being used for processing payments made to the merchant.

20. The method of claim 19, wherein the first computer authorizes payment to the merchant utilizing the electronic payment instrument data based at least in part upon the authorization data generated by the electronic payment device being valid and transmits the electronic payment instrument data to the second computer to allow the second computer to complete the transaction and process the payment to the merchant using the electronic payment data and the merchant account.

21. The method of claim 19, wherein the first computer does not authorize payment to the merchant based at least in part upon the authorization data not being valid.

22. The method of claim 19, wherein the second computer is managed by a host other than an issuer of the electronic payment instrument.

23. The method of claim 1, wherein neither the first computer nor the second computer is a computer of the merchant.

24. The method of claim 1, the authorization data comprising a randomly generated number.

25. A computer-implemented method for processing data related to an electronic transaction involving a consumer and a merchant, the method comprising:
- an electronic payment device of the merchant generating authorization data embodying data of a transaction involving the consumer and the merchant, the authorization data being encoded with data of a transaction involving the consumer and the merchant;
- establishing a near field communication connection between an electronic payment device of the merchant and a mobile communication device of the consumer when the electronic payment device and the mobile communication device are in contact with or located in proximity to each other, the electronic payment device transmitting the authorization data to the mobile communication device through the near field communication connection;
- transmitting the authorization data from the mobile communication device through a first network to a first computer hosting respective data of respective electronic payment instruments of respective consumers;
- decoding the authorization data received from the mobile communication device;
- storing the authorization data and associated transaction data in a database of or accessed by the first computer to associate the authorization data, the transaction data and the electronic payment instrument data of the consumer;
- the electronic payment device transmitting the authorization data through a second network to a second computer of an electronic payment processor;
- transmitting the authorization data and transaction data from the second computer through a third network to the first computer to request electronic payment data of the consumer, wherein the authorization data is decoded;
- searching the database to determine electronic payment data and transaction data corresponding to the authorization data received at the first computer from the second computer;
- comparing the transaction data stored in the database and the transaction data received from the second computer;
- if the transaction data received from the second computer matches the transaction data stored in the database, transmitting the determined electronic payment data from the first computer to the second computer; and
- completing the transaction utilizing the second computer, wherein the mobile communication device serves as a mobile wallet without transmitting data of an electronic payment instrument utilized by the consumer to the electronic payment device, and the authorization data is to be used by the first computer to determine whether payment to the merchant should be authorized to complete the transaction involving the mobile communication device.

* * * * *